United States Patent

[11] 3,614,744

[72] Inventor James W. Sweeney
Norman, Okla.

[21] Appl. No. 837,237
[22] Filed June 27, 1969
[45] Patented Oct. 19, 1971
[73] Assignee The University of Oklahoma Research Institute

[54] GENERALIZED INFORMATION PROCESSING

11 Claims, 11 Drawing Figs.

[52] U.S. Cl. .......... 340/172.5
[51] Int. Cl. .......... G06f 15/40
[50] Field of Search .......... 340/172.5; 235/157

[56] References Cited

UNITED STATES PATENTS

| | | | |
|---|---|---|---|
| Re. 26,429 | 8/1968 | Kaufman et al. | 340/172.5 |
| 3,030,609 | 4/1962 | Albrecht | 340/172.5 |
| 3,243,783 | 3/1966 | Rabenda et al. | 340/172.5 |
| 3,302,186 | 1/1967 | Raser et al. | 340/172.5 |
| 3,332,069 | 7/1967 | Joseph et al. | 340/172.5 |
| 3,358,270 | 12/1967 | Crew et al. | 340/172.5 |

*Primary Examiner*—Gareth D. Shaw
*Assistant Examiner*—Sydney Chirlin
*Attorney*—Richards, Harris & Hubbard

ABSTRACT: Strings of variable content natural language alphanumeric data are stored in computer memory at addressable locations along with an internal format code and a relative address. The data is serially compared with stored variables which produce truth responses through the internal format code. The number of responses per variable is stored. The addresses of data for each said truth response satisfying a predetermined logical combination of said variables are stored. Thereafter, data at the stored addresses are serially compared through the internal format code with at least one additional variable. The truth responses of said additional variable render accessible in storage the addresses of the corresponding data for each such truth response.

GENERALIZED INFORMATION PROCESSING

THE INVENTION

This invention relates to information retrieval and more particularly to the search and identification of stored natural language textual data through successive iterations by way of an internal format code where each iteration is limited to a subset identified by a prior search through a data base stored in direct access memory.

Information retrieval systems for various specific purposes have heretofore been devised and information retrieval is widely practiced. Such operations have made clear a need for an information retrieval system having general applicability and capable of accommodating data of variable length and free from rigid data formats.

Examples of systems for information retrieval heretofore known are disclosed in applications of "Electronic Data Processing Systems to Legal Research," Bureau of National Affairs, 1960, p. 7–10, and also embodied in the Computer Query System described in a publication of the above title published by the National Institute of Health, Division of Research Grants, Statistics and Analysis Branch.

The present invention provides an information retrieval system in which data stored in addressable memory locations may be searched, to identify a first subset. Data are then processed in dependence upon storage of the addresses of data in the first subset with subsequent iterations only through the data in the stored addresses.

More particularly, in accordance with the invention, information retrieval is carried out through direct access memory, where stored data is in natural language text. Based on stored variables or labels, the data in the data bank is interrogated for identification and storage of addresses of data in said bank corresponding with the variables. Thereafter, the subset of data corresponding with the stored addresses is then searched upon the basis of at least one additional variable, the truth occurrence of the additional variable in the subset identifying the addresses of the corresponding data.

Further, all operations are based upon satisfying one or more of three basic conditions, AND, OR and NOT.

For a more complete understanding of the invention reference may now be had to the following description taken in conjunction with the accompanying drawings in which.

Figure 9:
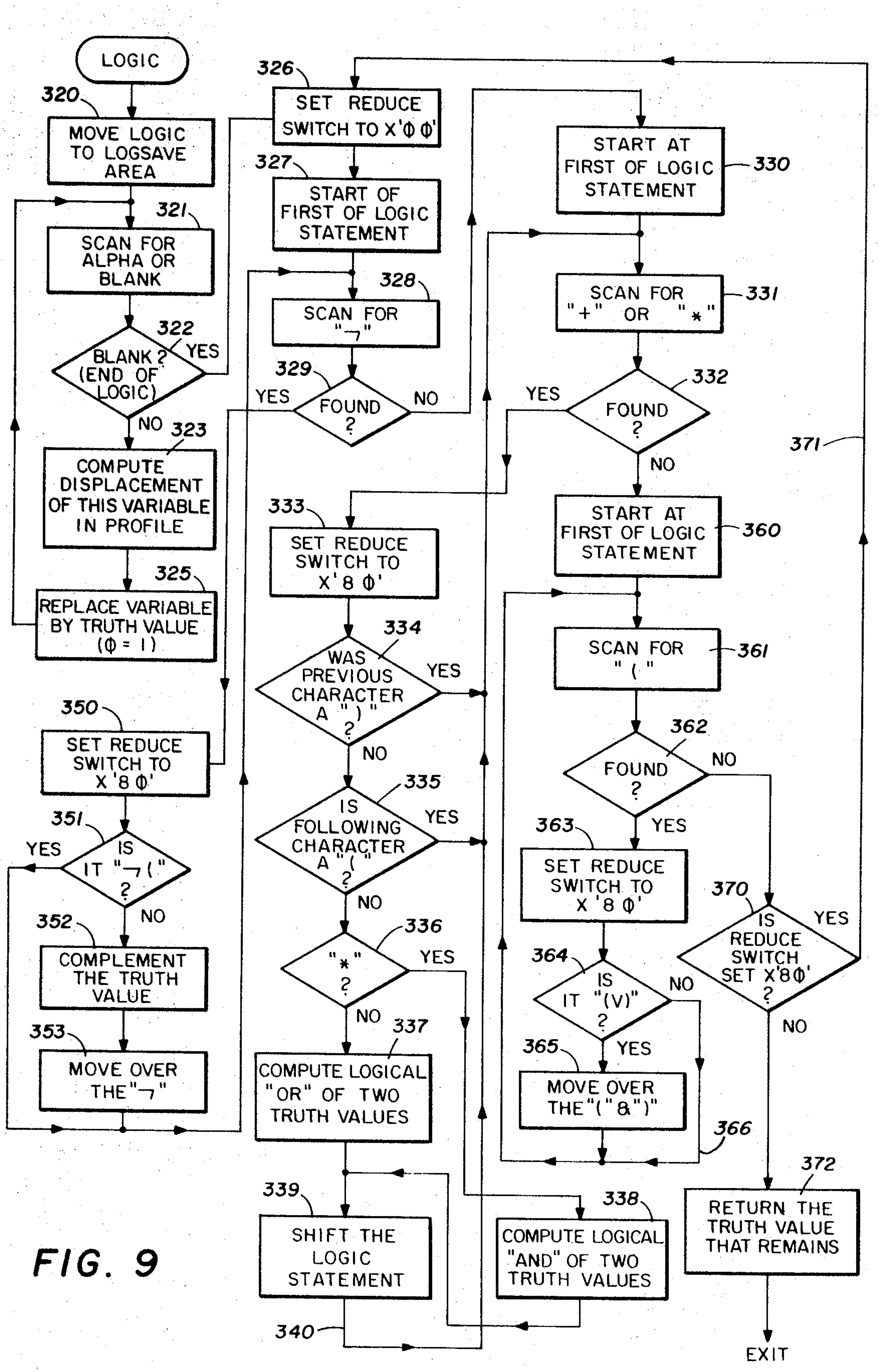
Figure 10:
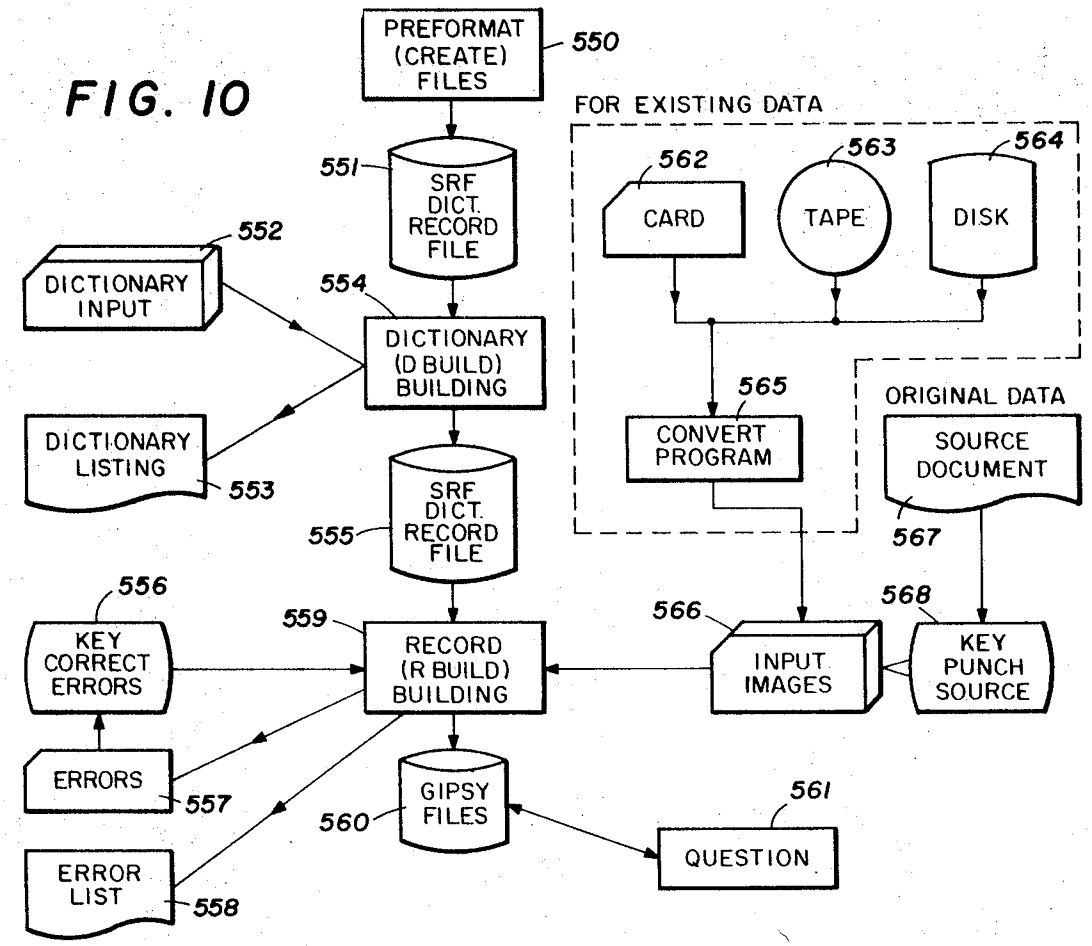

FIG. 9 comprises the flow diagram for a LOGIC subprogram which is used to determine the truth values of a selected profile;

FIG. 10 is a block diagram of the overall system; and

Figure 11:
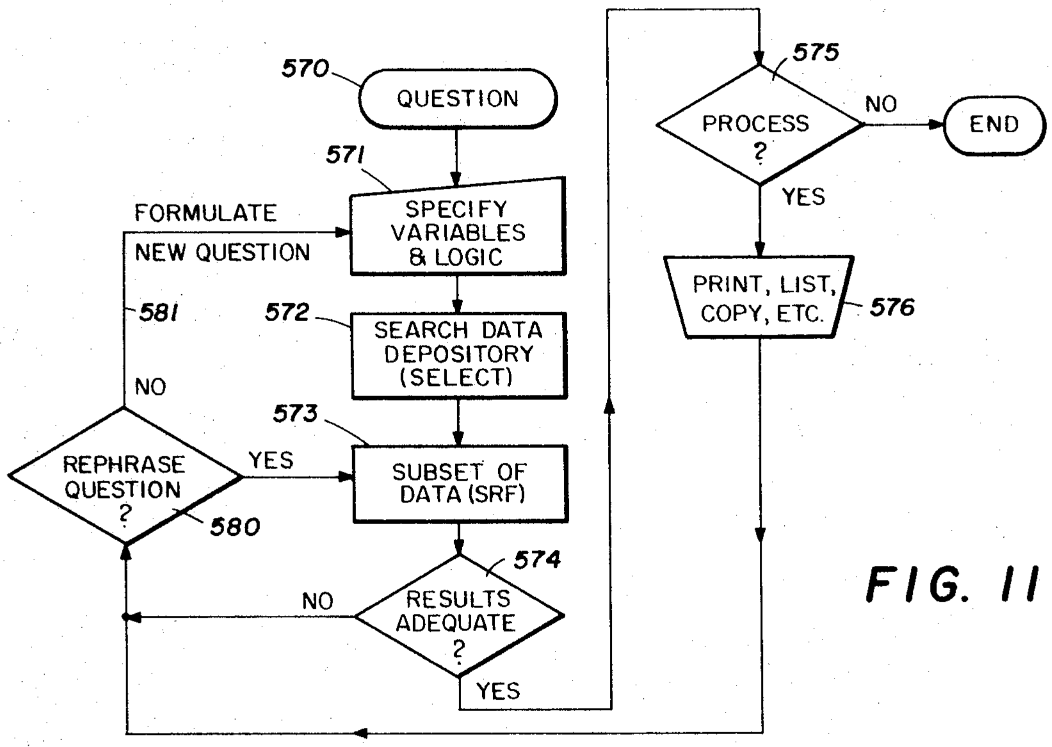

FIG. 11 is a block diagram of QUESTRAN.

INTRODUCTION

The present invention will be described in connection with a particular application of Gipsy in information processing and retrieval and will be described in connection with retrieval from large data collections. There will first be described the general nature of the system. Following that, there will be described the preferred mode of collecting information and building a data base which is stored in computer memory having direct access capability.

There will then be described, in connection with the accompanying drawings, the structure of the system as employed on such data base for identifying and retrieving information in the data base in response to selected criteria specified by the user. The criteria may include variable data and logic specifications as desired by the user.

I. GENERAL

The General Information Processing System (GIPSY) of the present invention provides for collection and querying of large data collections composed of numeric, codified or natural language information. GIPSY permits the user to pose complex queries against any and all information collected enabling the user to answer ad hoc inquiries developed after the information has been assembled without submitting to the complex and costly rigors of additional programming.

In a preferred embodiment of the invention herein described, information enters the system through a user-completed document designed to a specific application. The document is constructed so that each item to be collected is identified by a unique label. The information entering the system is only that which the user has described on the input document. A form description is then built to describe the structure of the source document and to identify the items of information on the document for inquiring and for printing.

Inquiries to the data collection are submitted to the system through QUESTRAN, the GIPSY retrieval language. QUESTRAN inquiries may be processed through a batch card system or through a typewriter terminal. Questions are stated to the system by identifying in terms of the above noted unique labels the items within a record to be searched, the condition or conditions the items must meet (if any) and the logical relationship (AND, OR, NOT) existing between the specified items. Results of the inquiry may be a count of the total number of records selected and the number of records satisfying each specified item which may be printed. The system, on command, may perform one or all of the following:

a. Print all or part of the selected records, b. Sort the selected records, c. Create a fixed length, fixed-field file of the selected records on various types of files such as disk, tape or card.

The GIPSY System is expressed in OS/360 Assembler Language, and will operate on IBM 360 series computers with a minimum of 1 2311 disk drive (or the equivalent direct access space) and 64K of core memory. The system is transferable from one 360 configuration to another.

II. INFORMATION COLLECTION AND CREATION

The process of collecting and creating data banks may be considered in four steps:

A. Information Analysis

A data bank is constructed after determining what information may be necessary to resolve a given problem and the level at which the information will be gathered.

This level and the associated information form a basic unit known as a record. A record is a distinct set of items relating, for example, to a medical patient or to an inventory record relating to a specific part. The record is the basic reference unit used in GIPSY. It is comprised of a number of related pieces of information called "items." The data bank is the largest storage entity. The record is the logical unit about which information is collected. The item is a single, logical unit of information contained within a record and is a predetermined variable portion of a record that may be classified in terms of a unique label.

Each record may be of variable size. That is, it may vary in the number of characters it contains. It also may contain a varying number of information items.

B. Input Form

A source document is completed by a user and then generally keypunched for entry into the system.

A document "label" is a unique descriptor associated with each item. It is used to identify the item when it is entered and, during retrieval, individual items are referenced by their labels. In assigning the labels to the information items, it is convenient to begin by constructing a hierarchical outline of the information to be collected. For example, a personal resume might begin with the major divisions of:

A. Personal Data
B. Education
C. Work History

D. References
E. Job Preferences

The first major division may now be further refined:

A. Personal Data
1. Name
2. Address
3. Telephone Number
4. Marital Status
5. Sex
6. Date of Birth Further refinements might be made:

4. Marital Status
   A. Married
   B. Single
   C. Divorced
   D. Widowed
5. Sex
   A. Male
   B. Female
6. Date of Birth
   A. Month
   B. Day
   C. Year The label may be alpha alphabetic, numeric, or alphanumeric. Labels of not more than seven characters in length are used. A label does not associate any hierarchical level with the information item it identifies. The labels may be random in character construction but a logical sequence is preferred in assigning the labels.

There are several ways of recording information on a source document, the most common being:

1. A single response exhaustive list,
2. A multiple response exhaustive list,
3. An inexhaustive list,
4. Modified list, and
5. Natural language text, which class may include the others GIPSY allows any or all of the described input forms to be used to record information on a source document. Each form has advantages and special uses as well as disadvantages. The choice of input form and design of the source document is a function of the user's specific application.

Each source document is given a "form" name composed of a predetermined number of characters, preferably eight, or less, alphanumeric characters (so used) to identify the description of the document as it appears in the dictionary and identifies the records to be searched during retrieval. Documents are keypunched for entry into the system. The form name is keypunched in the first card of each record. This name is then placed in each record on the physical file and used for reference during retrieval.

C. Dictionary and Form Preparation

Each form description used in the system is entered into a dictionary collection of form descriptions containing a label, level, item description, internal format code, and printing option for each information item (variable) within a record. Preferably each form described contains the following information for each entry:

1. Label—a unique alphanumeric identifier of not more than seven characters, assigned to each data item.
2. Spacing and level control—This is a two-digit number that determines the number of spaces indented from the left margin that this entry will be printed. It also functions as a level indicator which determines whether previous levels in the form description (if any) should be *printed* to qualify the present level. The spacing and level control entry will default to 01 if left blank.
3. Print Option—this option concerns the printing of user-written text (if any) for a given variable in relation to the information description supplied in the form. Three options are provided:
   1. Print the item description and any textual entry on the same line.
   2. Print only the textual entry in the record (if none—print nothing).

3. Print the item description on one line and any associated textual entry on the next line, indented two positions; if no text exists, print only the item description. A default option for the Print Option is the one (1).
4. Print Spacing—This option controls the line spacing between entries. The single character USASI codes used are:

| USASI Code | Explanation |
|---|---|
| *b* (blank) | Normal single spacing |
| 0 (zero) | Double spacing |
| – (dash) | Triple space |
| 1 | Skip to top of page |
| + (plus) | Suppress spacing |

The default option for Print Spacing is the blank (*b*) for normal single spacing.

5. Internal Format Code—Each label is assigned a unique number within each form description to be used in the internal storage of each record. At "record build time" this *number* is placed in the record *in place of the label* with which it is associated. This is done for storage economy and search efficiency. The number assigned, in the present example, is five digits or less in length.

All records created using a specific form will contain labels assigned internal format codes based on that form description. Subsequent changes to the form description *must* insure that the *same internal format codes be assigned to the same labels* as before the change.

6. Item Description—This textual description of the data item is used for printing purposes to describe the entry or establish a heading or title for lower level entries.

CARD FORMAT

| Card Column | Entry |
|---|---|
| 1–7 | label |
| 9–10 | Spacing & level combined |
| 12 | Print Option |
| 14 | Print Spacing |
| 16–20 | Internal Format Code |
| 22–80 | Interdescription |

The form dictionary file is created and maintained through a utility program DBUILD. This program allows the user to *build* a new dictionary or *add* form descriptions to an existing dictionary. Changing form descriptions that are already catalogued is accomplished by rebuilding the dictionary with all catalogued forms with the appropriate changes made in the form descriptions.

D. Record Creation

Creating records on the file is accomplished by the GIPSY program RBUILD. The program controlled operation:

1. Sorts the cards by the sequence number in card columns 1–8 to prevent errors from out-of-sequence input.
2. Error checks the input to insure that the labels are in the form description and that the keypunch format is correct.
3. Creates internal system format record on the file for all records without errors.
4. Prints a list of all records in which one or more errors were detected and indicates the nature of the error.
5. Punches a duplicate set of cards for all records containing errors.
6. On option it can also print a copy of all records that are created on the file.

The size of a GIPSY record is limited by the size of the maximum allowable physical record of the direct-access device used. The following relation must be satisfied:

$$4(C+P)+p(\overline{p}=2)+K<R$$

Where:

$C$ = Number of check-off labels (Labels with no text associated)

$P$ = Number of textual entries $\bar{P}$ = Average text length $K$ = Constant = 20

$R$ = Maximum physical record length of direct-access device in bytes.

For an IBM 2311 disk this reduces to:

$$4C+6P+P\bar{P}<3605$$

With an assumed $P$ of 20 characters and with no textual entries, 901 labels would be allowed and with no check-offs, 138 textual entries would be allowed.

III. INFORMATION RETRIEVAL

A. General

The GIPSY Retrieval System is composed of program modules, controlled by an executive system, which will validate input form, direct inquiries of the file and process output. The system communication is through a user-directed, incremental language known as QUESTRAN. Through this device the user specifies the parameters of his question, identifies the file to be interrogated and selects appropriate output processing.

The retrieval process operates in the following general manner:

1. An information bank is identified to the system.
2. A question is entered into the system by entering as through a typewriter terminal keyboard the labels of variables involved and their logical association.
3. A serial search of the record file is initiated checking the inquiry parameters against all records in the file or in a subset.
4. Records meeting search criteria are selected by having their addresses stored on a selected records file.
5. A count of the number of records searched and the number selected, as well as the number satisfying each individual variable, is displayed after each inquiry.

There are two processing modes in which the retrieval system can function. These modes are the batch or card system mode and the teleprocessing or remote mode.

B. QUESTRAN Structure

The GIPSY retrieval operation involves, in QUESTRAN, incremental language *commands* and *parameters*. The commands describe major functional operations within the system and the parameters qualify and describe the macro operations initiated by the commands. The executive routines interpret the commands and call special program modules which, in turn, interpret and are directed by the specified parameters. The commands in QUESTRAN are:

| | |
|---|---|
| FORM | PRINT |
| SELECT | LIST |
| ITERATE | SUM |
| DELETE | MESSAGE |
| SORT | COPY |

The *FORM* command is used to key the system to a specific form description. The parameter is the name of the desired form description. This command is issued at the beginning of each GIPSY run. Once established, however, the system will reference only that form specified until another form command is issued or the run terminates. Once entered, the form command need not be reentered during the run as long as the user does not desire to access data stored in the record file by way of a different form.

The *SELECT* command is used to initiate the retrieval mechanism of QUESTRAN. The parameters are classified into two types and are used to describe the inquiry to the system. The parameters to the select command are the *variable* and the *logic* descriptions.

The variable description describes the selection characteristics of an inquiry. For example, if the question "Print the records of all employees with a BA degree who are over 25 years old and who live in New York" were asked of the computer with reference to a personnel file, employees would be selected by the following characteristics:

A. over 25
B. BA degree
C. Lives in New York.

The logic description indicates how the variables are linked. The logic uses the Boolean AND, OR, NOT connectors. In the above example, for instance, all criterion must be satisfied so that the logical association between the variables would be AND (over 25 *AND* BA *AND* live in New York).

A *variable designator* is a unique single alpha character used to identify one variable from another within a single question. A *label* designates a specific data item within the record. It is used to identify a specific piece of information, such as an entry on a list, or an area in the record within which the specified condition will be applied. A search argument specifies what criteria the system should search for in the textual area identified by the associated label. This condition is specified in either a word mode or a number mode.

1. Word Mode—This mode searches for a single word, phrase, "word range" or part of word throughout the total textual entry described by a given label. No interpretation is made of the specified condition. The search is for exactly the characters specified. Four methods of entering a word search are used:

Prefix—Specified by inserting a leading blank in the search argument, e.g.

A. JOB <*b*PRO>—Would search for a word in the textual entry in label JOB that began with letters "pro." For instance, "Profile," "Proper," "Prospect," "Pro," but not "pr," "print," "reprogram," or "unipro."

Suffix—Specified by a blank inserted after the desired word in the search argument, e.g.

C. JOB <TION*b*>—Would search for a word in the textual entry in label JOB that ended in "tion." For example: "action," "transportation," "tion," but not "onion," "ion," or "tione."

Existence—Specified by no leading or ending blanks in the search argument, e.g.

W. JOB <SS>—Would search for the existence of the letters "SS" at the beginning, middle, or end of any word in the textual entry in label JOB. For example: "assist," "stress," "sst," "sss," but not "ask," "set," or "sps."

Word—Specified by inserting both a leading and ending blank in the search argument, e.g.

P. JOB <*b*CALL*b*> Would search for the word "call" in the textual entry for label JOB. For instance, it would find "call" but not "recall," "caller," "cal," "all," or "-callcall." The four options are also used for:

Word Range—Specified by the two "ends" of the range, e.g.

X. JOB <*b*SAM> THRU <*b*STE>—Would search for any word in the textual entry in label JOB that was in the "collating sequence" between SAM and STE. (Note the leading blank—this would be a prefix search.) For example, this would find "Samuel," "-space," "SB5," "Sam," "Stewart," but not "Susan," "-haste," or "sable."

2. Number Mode—In this mode a specified textual entry is searched until the first number is detected and then the specified search argument is compared therewith. Numbers are automatically converted into a standard concatenated form for true comparisons. Thus, in number mode +05, 05.0, 5. and 5 would all be equal. There are four methods of specifying the number mode condition:

Equal D. AGE EQ 10.0

In this case the search is for numbers in the textual entry in label AGE, numerically *equal* to 10. This would find "+10," "10.00," "0010," but not "−10" or "10.000001."

Less Than E. AGE LT 20.5

In this case the search is for numbers encountered less than 20.5. For instance: "19," "20.0," "+10" but not "20.5," or "30."

Greater Than F. AGE GT 5.

In this case, the search is for numbers greater than 5. That is, "10.0025," "+6," "5.001," but not "−5," "4.99999," " or "5."

Number Range H. VALUE −10 THRU 5.03

In this case the search is for numbers between −10 and 5.03, inclusive. For example: "2.01," "−10," "5.03," "5.02999, "−1.8," but not "−11.0," "5.031," or "7.8."

Preferably, description of the variables, i.e., the label, is shortened by using a shorthand, or ditto mark, for the label. This ditto mark (the $) is used to:

1. Duplicate the previously used label.
   A. JOB <PROGRAMMER>
   B. $ <ANALYST>
   C. $ <OPERATOR>
2. Duplicate the previous specified search argument.
   A. JOB <ANALYST>
   B. HISTORY $
   C. NEW JOB $
3. Duplicate both the previously specified label and search argument.
   A. JOB <ANALYST>
   B. $ $ The *logic* description is the final parameter entered in the SELECT Command. The full Boolean range is used to specify the logical association between the specified variables. In the logic statement the variables are identified by the single character variable descriptor. The logical AND, OR, NOT operators may be used interchangeably with the single character equivalents "*," "+," ">." Parenthesis may also be used to avoid any possible ambiguous interpretation of the logic description. Variables in the variable description parameters may be identified more than once in the logic statement. Also all variables appearing in the variable description need not appear in the logic description.

A typical logic description for the variables in the previously described personnel search could appear as follows:

LOGIC (A AND B AND C)

The ITERATE Command is employed to restrict the number of records processed during an inquiry. This command causes the system to process the next inquiry against the subset of records selected as a result of the previous question. The user can either initiate a job with the ITERATE Command (in which event the last subset created as a result of the last run would be used) or issue it after a SELECT or ITERATE in the same run. The parameters for the ITERATE Command are the same as those for the SELECT.

The COPY Command is used to construct fixed-field, fixed-length records from the variable-length GIPSY record. Output is on a tape file, disk, printer or card punch depending upon the user. COPY processes those records that have been selected by a previous inquiry. Although the COPY function is intended for interface between GIPSY and fixed-field processing systems it can also provide the user with some report generating capability. The parameters to COPY specify the information to be copied from the selected records or a literal to be inserted into the output record. Literal processes allowed are substitution of one of two specified literals, based on the presence or absence of an information item and the insertion of a literal at desired locations in the output.

The COPY parameters are:

JOB *x*
: This causes the first "*x*" number of characters from the textual entry for label JOB (starting with the first nonblank character) to be outputted to the next "*x*" positions of the output record. If no text exists, blanks are inserted.

AGE *x.y*
: This causes the first number to be located in the text for label AGE and "*x*" digits to be outputted to next "*x*" positions of the output record there is an assumed decimal place "y" digits from the right of the "*x*" position field. Again, if there is no number, the output is filled in with blanks.

VET 'YES' 'NO'
: This causes the first literal, i.e., 'YES' to be outputted if the label VET is in the present input record. Otherwise, the second literal is outputted. This is to allow operations on existence. The length of the longest of the two literals is used and the shorter is padded on right. Maximum size for either literal is 10 characters. Literals must both be enclosed in single quotes.

'ANY LITERAL'
: Causes the characters between the quotes characters to outputted as the next characters.

FORM NAME
: Causes the form name of the present input record to be outputted, left-justified in the next eight positions of the output record.

RECORD ADDR
: Causes the internal file address of the present input record, i.e., TTRZ & RR, to be outputted in the next six positions of the output record for Index.

NEW RECORD
: Causes what has been built up to this point to outputted without getting a new input record. This is to allow building multiple output records for each input record.

/
: The symbol "/" signifies the end of the parameter list.

A typical set of parameters might appear as the following:

```
COPY
   NAME 4
   AGE 3.0
   '**'
   VET 'YES' 'NO'
   FORM
   /
```

Which would produce the following output records:

```
STAN025** YESFORM0001
WALL104** NO FORM0001
AT 768** YESFORM0001
.
.
.
```

The PRINT Command instructs the system to print the selected records using the last-named form for printing control. In batch operations there are no required parameters to the PRINT Command. The user may, however, insert a parameter to place a heading on each record printed. This is accomplished by following the PRINT Command with another card with the heading starting in other than card column one.

The LIST Command is employed to print designated portions of selected records instead of the entire record. Like the PRINT Command, LIST uses the last-named form to identify the individual items printed. The parameters to the LIST Command are the labels of the items to be printed. The list of labels is terminated by a slash (/).

The SUM Command is used to find the summation and/or average numerical value of given item(s) among the records selected. The SUM will add all the numerical occurrences of the specified item together and print:

a. The number of occurrences in the selected subset (this count does not include occurrences of the item when it is not in the record or when it is nonnumeric).
b. The numeric average
c. The algebraic sum d. The maximum value of the item
e. The minimum value of the item.

The command can be used to sum up to nine separate items simultaneously. The parameters to the SUM Command are the labels identifying the items and a slash (/) which is used to terminate the list.

The SORT Command is used to sort the selected records and reconstruct the Selected Record File in the desired sequence. The records can be sorted by several fields which are specified in the parameters. The number of sort fields will be limited by the space allocated for the sort areas. The parameters to the SORT Command are the label(s) of the fields to be sorted. They are entered in the order of sorting priority (the primary field being entered first followed by the secondary, etc.) as follows:

| | |
|---|---|
| JOB *x* | This causes the first "*x*" number of characters from the textual entry for label JOB to be outputted for sorting. |
| AGE *x.y* | This causes the first number to be located in the text for label age and "*x*" digits to be outputted with an assumed decimal point "y" digits from the right. |
| VET 'YES' 'NO' | This causes the first literal, 'YES' to be outputted if the label VET is present on the record. Otherwise, the second literal, 'NO' is outputted. |
| / | Specifies the end of the list. |

The MESSAGE Command is used to send messages to a console operator at the computer remote from a user terminal. The parameter is the message to be sent to the operator.

The DELETE Command is used in batch operations to flag, for deletion, those records which have been selected to the Selected Record File. The Delete Command will print copies of the deleted records. The printing is overridden by using the NOPRINT parameter to the Delete Command.

Having described in a general way the formation of a data base and the various commands used in QUESTRAN, there will now be described in connection with the drawings the method particularly involved in the SELECT and ITERATE operations which form a part of QUESTRAN and to which the present invention is particularly directed.

After the data base has been built and is available in memory, retrieval language is transmitted to the computer to initiate the data retrieval operation. By way of example, a teleprocessing mode of operation may begin with a dialogue by the user entering the *FORM* Command by typing "FORM" on a terminal console and transmitting the same to the system. The system may then respond by typing dashes underneath the word FORM to indicate it has recognized a valid command. The user then may type in the name of the data base to be searched. To initiate the search operation, the user will then type in the word "SELECT." The system may then respond by typing the dashes thereunder.

The search criteria is entered by:

a. Identifying each variable with a single, unique alphabetic character (variable descriptor).
b. Specifying the label of the item in the record to be searched.
c. Specifying the condition (if any), to be used as a search argument. (This search argument is applied only to the items specified by the label (*b*) above). This procedure (*a* through *c*) is repeated for each variable in the question.

The relationship between the stated variables is then expressed in the LOGIC statement. This is done by typing in the word LOGIC and following this with the Boolean relationship (AND, OR, NOT) that must be satisfied for a record to be selected. The variables preferably are identified in the logic statement by using the single alphabetic variable designator. The variables are then combined using the logical operators AND, OR, NOT.

The above procedures are illustrated by the following example which will be used in connection with a description of the drawings.

QUESTION: Find all references in the data base pertaining to EVAPORITE in the title or in the list of terms (key words) stored in the data base for each paper.

This search is carried out by entry of the information in Table I to the computer as via a terminal console.

TABLE I

```
FORM
-----
USGS01
SELECT
-------
A.   TITLE * EVAPORITE"
          TITLE
B.   TERMS * EVAPORITE"
          TERMS
LOGIC A OR B
```

The results of this initial search are to be displayed at the terminal as shown in Table II and preferably will consist of:

a. A count of the records SEARCHED.
b. A count of the records SELECTED and a SUBSET indicator.
c. A list showing the number of times each variable was found throughout the film without implying that it met the criteria specified in the logic statement.

TABLE II

| | | | |
|---|---|---|---|
| SEARCHED | 28410 | | |
| SELECTED | 103 | SUBSET | 1 |
| VARIABLES SATISFIED | | | |
| A | 44 | | |
| B | 97 | | |
| ITERATE? | | | |
| YES | | | |

The above example involves data entered into the storage system in Form No. 1, United States Geological Survey. The SELECT Command in the initial search directs a search in the title from the data base by the word "evaporite." It also directs a search for the term "evaporite" in the list of terms (key words) selected from each of the documents in the data base.

The logic parameters, as contrasted with the variable parameters, direct identification of all documents in which the term "evaporite" appears in the title *or* in which the term "evaporite" appears in the list of terms.

It will, thus, be understood that in accordance with the U. S. G. S. Form No. 1 that the data base comprises (1) storage of the title of each document; (2) storage of a list of key words or terms is taken from each document; (3) an abstract; (4) the date of publication; (5) citations to the publication; (6) the names of the authors; and (7) a "type" of document characterization. For the example now to be used, the parameters listed above will be understood to have been applied to the computer.

Figure 1:
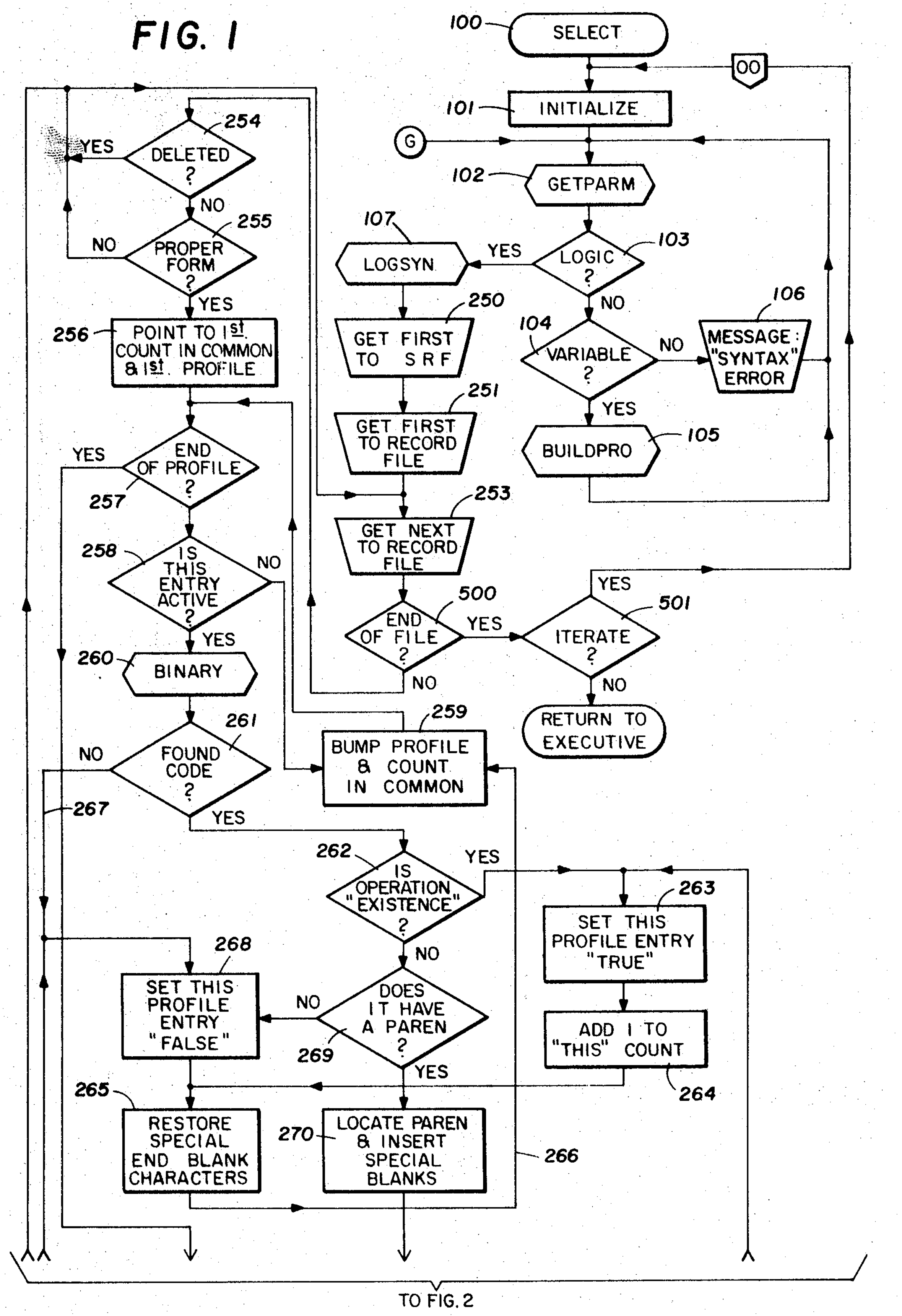
FIGS. 1–2 illustrate a major portion of the data processing method and particularly the SELECT routine.

With that background and referring now to FIG. 1, 2, it will be understood that the SELECT module is a major module responsible for the retrieval of the documents satisfying the parameters in the above example.

In the initialization step 101 the computer restores registers and dynamically allocates storage space for common areas and initializes necessary accumulators to carry out the SELECT routine. The getparm step 102 reads all of the parameters to the SELECT command, namely, the A, B, and LOGIC parameters of TABLE I. The parameters are then stored in memory. In step 103, the first parameter stored in memory, namely, parameter A of TABLE I, is tested to determine whether or not it is a variable parameter or a logic parameter. In TABLE I, A is a variable parameter and not a logic parameter. Therefore, the first parameter is tested in step 104 to determine whether it is a variable. In this case, it is; thus, the program calls for the BUILDPRO subroutine 105. In the event that the comparison in step 104 is false, meaning neither a logic nor a variable parameter is present, there is transmitted in step 106 a message to the user indicating the existence of a syntax error; whereupon the computer returns to the getparm step 102. Upon return to step 102 and in response to the profile (TABLE I) stored in memory, the second parameter is entered into the SEARCH profile. In step 106, communication of the existence of a syntax error to the user permits checking of the actual parameter and correction of the same so that all desired interrogations of the data base may be carried out.

Figure 4:
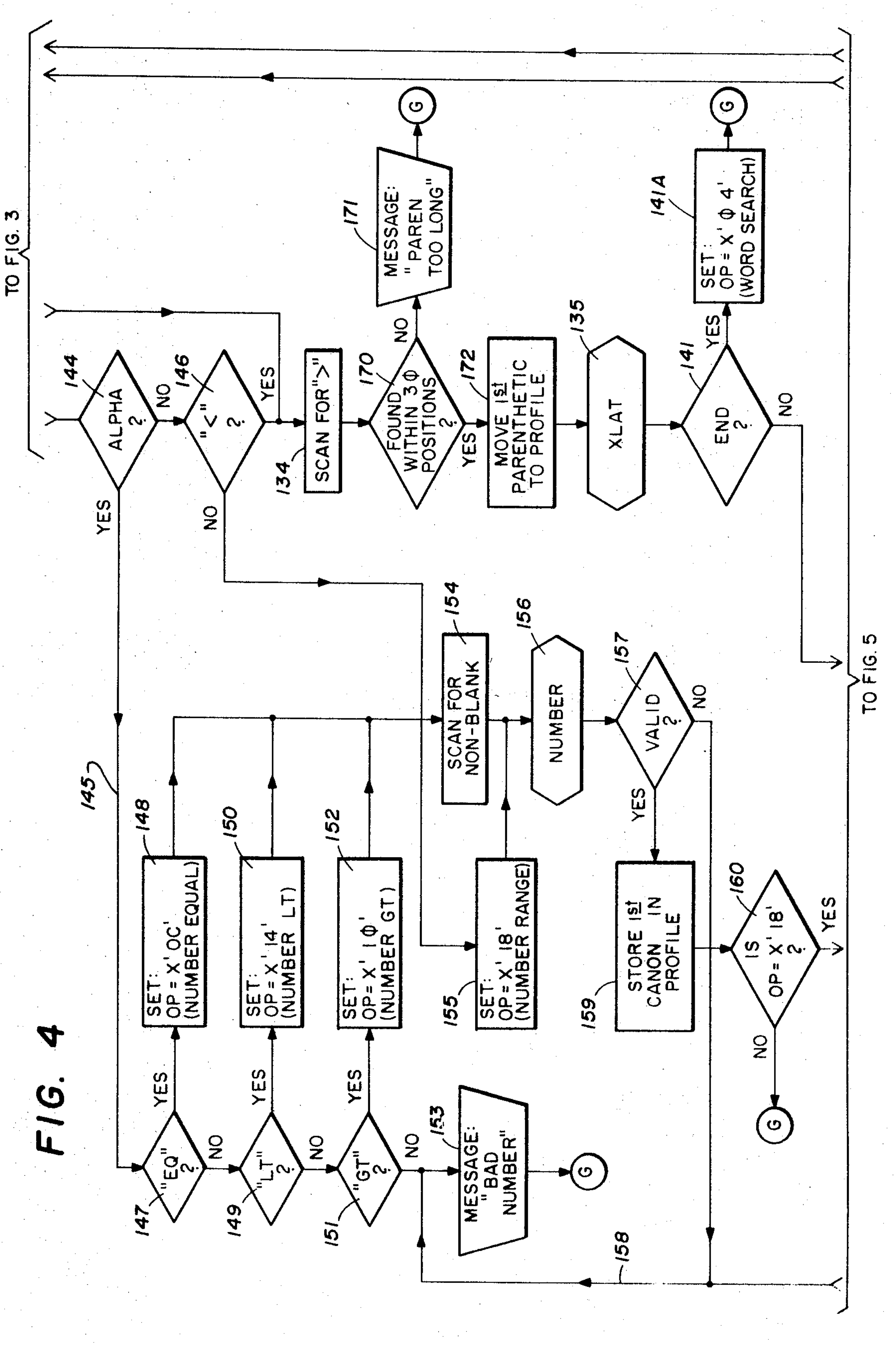
Figure 5:
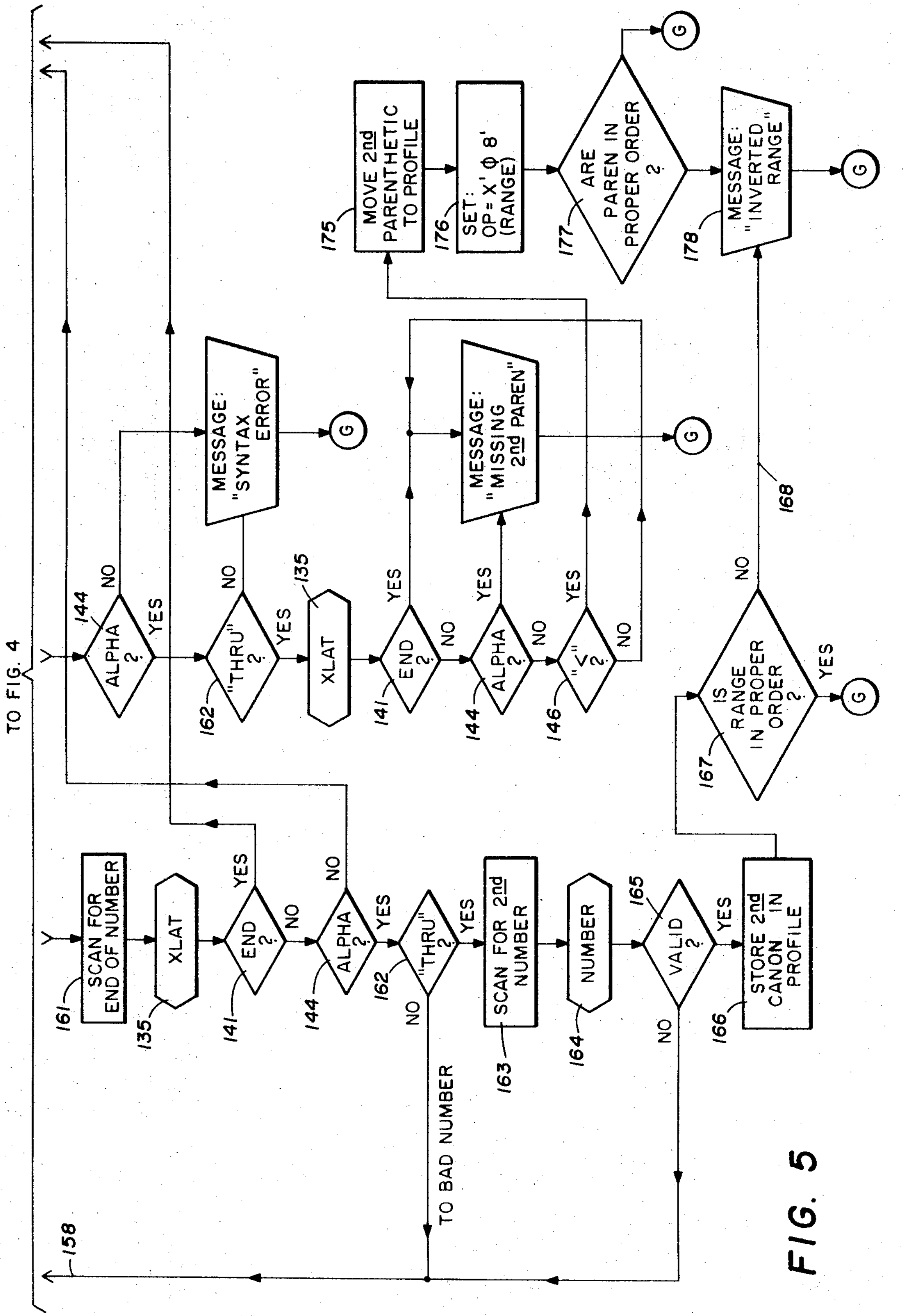

When the third parameter of TABLE I is employed, the answer from step 103 (logic check) is yes. In such case, the identification of the documents in the data base proceeds to the LOGSYN subroutine beginning with step 107. However, before discussing the LOGSYN subroutine, there will be discussed now the BUILDPRO portion of the operation indicated as step 105 of FIG. 1 and shown in detail in FIGS. 4–6.

FIGS. 3–5

The BUILDPRO subroutine interprets the parameter statements, translates the coded information, and initializes an entry in the profile for each variable entry. More particularly, step 110 determines which profile entry is to be initialized. That is, this is done by computing an address in the profile from the variable designator.

In step III, the variable A is checked to see if it has previously been entered. If so, then the present attempt is a duplication. If previously entered, the fact is indicated in step 112 whereby the program returns to the getparm step 102, FIG. 1, such return being designated herein by the symbol G. It will be noted that there frequently will be encountered steps throughout the operation of the system wherein return will be necessary to the getparm step 102, each being indicated on the drawings by the symbol G.

Since the parameter A, TABLE I, is for the first time being entered, the comparison in step III is no so that the parameter is then checked in step 113 to see if it is the highest variable. In this sense, the variable B is "higher" than variable A. If A is the highest entry, then a pointer or key is stored in step 114. In either case, in step 115, the profile entry is flagged as active, for a later check for duplication.

In step 116, the remainder of the statement is scanned and is checked to see if there is anything in the statement beyond the mere designator A. In step 117, if the indication is that a designator only is present, then the message is incomplete and in step 118 the program returns to getparm 102.

If, in addition to the designator A, there is additional material to the statement, then a comparison in step 119 is made to see if it is alpha-type information, in step 120 to see if it is numeric-type, and in step 121 to see if it is a period. If an examination is made of the first parameter to the select command in TABLE I, it will be noted that the A must be followed by a period. Thus, the steps 119, 120 and 121 are successively carried out with the operation returning to step 116 in accordance with the loop 122. Having found the period present, then the statement is scanned to see if there is more. Finding more, then the check is made in step 119 to see if the remainder of the statement is of alpha character, or, in step 120, to see if it is of numeric character. In the present case, the word "TITLE" is encountered, thus, it is of alpha character. In such case, the branch 124 is followed. In step 125, the statement is scanned for a blank or a "less than" symbol, i.e., "<." In step 126, the statement is checked to see if a < found within the statement within eight positions of the label "TITLE." The number of positions will be recognized as somewhat arbitrary, and, in the present case, set preferably at eight. The existence of a < signifies that a search argument will be encountered. If there is no <, then the message code is too long to be accommodated and the operation will return to getparm 102.

If < is found within eight positions of the title, then the title code is moved to and stored in the parameter list. This procedure establishes the necessary linkage to a subprogram "DFINDE" in step 128 which is external to the SELECT/ITERATE module. The DFINDE program searches a dictionary file and returns an internal format code to be inserted into the profile and memory for this entry.

In step 129, a check is made to see if the label "TITLE" is found in the dictionary.

In step 131, having found the label "TITLE" in the dictionary, the internal format code therefor from the dictionary is placed in the profile.

If not found, then, in step 130, the operation is returned to getparm 102.

In step 132, a check is made to determine what terminated the last scan. In the present case, the symbol < terminated the last scan and, thus, the operation follows the loop 133 to step 134 where the statement is scanned for the symbol >.

Figures 6, 7:
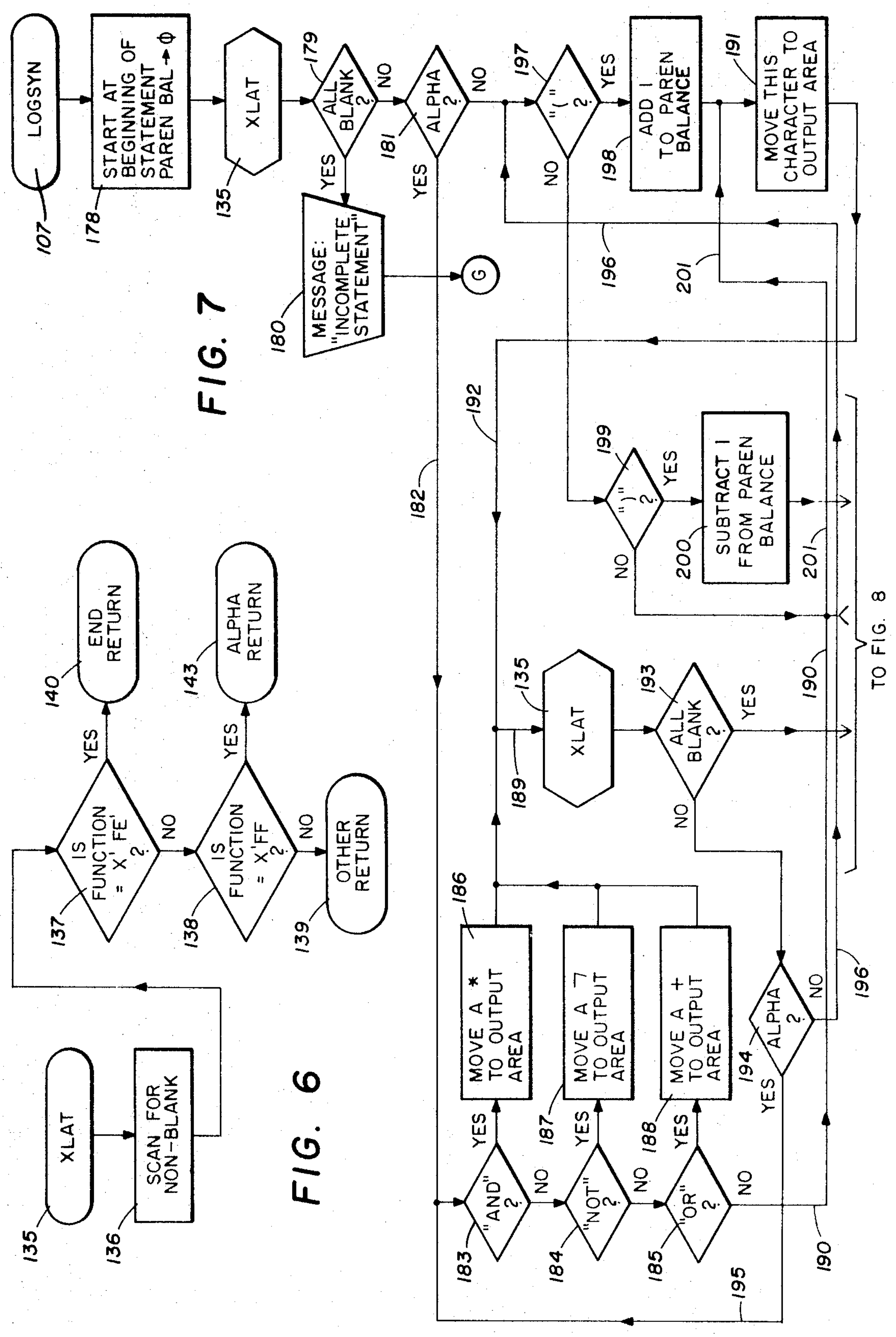
FIG. 6 illustrates a translate (XLAT) subroutine that is used at various points in the select-iterate process.
FIGS. 7 and 8 illustrate a LOGSYN subprogram used to evaluate logic statements.

If a symbol < or if a blank terminated the last scan, then in step 135 an XLAT subroutine such as shown in FIG. 7 is called upon. In accordance with this subroutine, the statement is scanned for a nonblank point in the statement, in step 136. In the present example, symbol < was encountered. In step 137, the statement is checked to see if the end of the statement has been encountered. In the present example, the end had not been encountered, since all that was encountered was the symbol <. In step 138, the statement is checked to see if the character encountered is alphabetic. In the present case, the symbol < is encountered. Thus, the program proceeds to step 139 which is the "other" return.

In step 137, FIG. 7, if the end of the statement is encountered, then the "end" return step 140 returns the operation to step 141 and, in step 142, a profile entry is made to indicate the existence of an operation of "existence checking only," wherein mere existence of some designated feature is searched. The operation then proceeds to getparm 102.

In the comparison step 138, FIG. 7, if the statement is alpha in character as indicated by step 143, then the operation returns to step 144 and follows loop 145. If in FIG. 7 the comparison is neither an "end" nor an "alpha" character, then the "other" return step 139 returns to step 146 to determine whether or not a symbol < is encountered. If the answer is yes, then the operation proceeds to step 134 where the statement is scanned for the symbol >.

In step 144, assuming that the return from the XLAT subroutine of FIG. 6 is an "alpha" return, then the loop 145 is followed and a check is made in step 147 to determine if the alpha portion of the statement encountered in XLAT 135 was the symbol "EQ," requiring a subsequent comparison to be exactly equal. If this check in step 147 is yes, then, in step 148, the profile is initialized to indicate a number-equal operation is to be performed. If the alpha symbols are "LT," meaning less than, then the profile is initialized to indicate an operation "number less than" is to be performed. If the alpha symbol encountered is "GT" then the profile is initialized to indicate an operation "number greater than" is to be performed. If the alpha symbols encountered do not correspond with either EQ, LT or GT, then in step 153 a message indicating a bad number is transmitted to the user and the operation returns to getparm.

In response to satisfying any one of steps 148, 150 or 152, the statement is then scanned for a nonblank entry that can serve as a number candidate. This is done in step 154.

If, in the XLAT subroutine step 146, no symbol < is encountered, then, in step 155, the profile is initialized to indicate an operation "numeric range" is to be performed.

In response to either step 154 or 155, a subroutine is called in, in step 156, to interpret the number candidate and return a canonized or standard form of the number subsequently to be stored in the profile.

In step 157, the number is checked to see if it is a valid number. If not, then loop 158 is followed to signal, in step 153, a bad number message and to return the operation to getparm 102. If the number is a valid number, then, as indicated in step 159, it is stored in the profile.

In step 160 a check is made to determine if the operation is "numeric range." If it is not "numeric range," then the operation returns to getparm 102. If it is a "numeric range" operation, then, in step 161, a scan is made to identify the end of the number. As a result, the XLAT subroutine 135 is again called in with the same steps 141 and 144 following. If the end of the statement is not encountered, then it is an alpha statement, then a check is made, in step 162, to see if the statement designates the search is to be made for any number within the range from one number through higher number. If the answer is no, the loop 158 is followed as above described. If the answer is yes, the statement is scanned, in step 163, for the second number.

In step 164, any number candidate found in step 163 is evaluated and a canonized form returned to be subsequently interrogated for its validity. More particularly, in step 165, the number is checked to see if it is valid. If it is not valid, the operation returns by way of loop 158. If it is valid, then a second canonized number is stored in the profile in step 166. Following this step, a check is made to see if the range of numbers between the first number stored in the profile and the second canonized number stored in profile is of the proper order, step 167. If it is of the proper order, the operation then returns to getparm 102. If it is not of the proper order, then the operation follows loop 168 to signal to the user a message "inverted range" and the operation returns to getparm 102.

It will be remembered, in step 134, the statement was scanned for a symbol >. In step 170, if the symbol > is not found, then in step 171 a message is transmitted to the user "-parenthetic, too long." If the symbol > is found within a predetermined number of positions (preferably 30) of the symbol <, then the operation shifts to step 172. In step 172, the statement within the symbols <> is shifted to the profile. In the present case, the word "evaporite" would be shifted to the profile.

The operation then shifts to the XLAT subroutine 135 with the comparison 141, 144, and 162 resulting. If the end of the statement is encountered in step 141, then the profile is initialized to indicate the operation is to be a word search. The operation then proceeds to getparm 102. If, in either step 144 of 162, the answer is no, then a message "syntax error" is transmitted to the user and the operation returns to getparm. If, in step 162, the answer is yes, then the XLAT subroutine 135 is again called with the steps 141, 144 and 146 following. If, in step 141 or 144, the answer is yes, or if in step 146 the answer is no, then a message "missing second paren" is sent to the user and the operation returns to getparm 102.

If, in step 146, the answer is yes, then the second parenthetic is moved to the profile, step 175.

The above operation may well occur. For example, rather than search for only the word "evaporite" the statement might have included the requirement that a check be made for all words whose first three letters are between "sat" and "som." Thus, in that case, words such as "set" would satisfy the search argument. Thus, while the example of TABLE I is relatively uncomplicated, the capability of the operation to accommodate more complex operations will be seen from the structure described.

Continuing now with the example, in step 176, the profile is initialized to indicate the operation is to be a "word range" operation. In step 177 a check is made to see if the parenthesis are in proper order, as was done in step 167. If the answer is yes, then the operation returns to getparm 102. If, the answer is no, then a message "inverted range" is transmitted to the user, and the operation returns to getparm 102.

Thus, from the foregoing, it will be seen that the operations involved in building a profile have been described. It will be understood that the profile will be built by successively introducing each of the parameters of the SELECT command in succession. The operations above described relate only to the variables of the SELECT command.

There will now be described the operations which respond to the LOGIC parameter.

FIGS. 1, 7 AND 8

Referring now to FIG. 1, it will be remembered that in TABLE I the first two parameters of the SELECT command were variables so that the operations proceeded from the logic comparison step 103 to build pro step 105. However, after all of the variables have been entered, then the final parameter to the SELECT command is the logic statement. In the present case, the logic statement requires the system to identify every document that satisfies the A *or* B variable parameters.

More particularly, if, in step 103, the answer is yes, indicating that the parameter is a logic parameter, then the operation shifts to the LOGSYN subprogram beginning with step 107.

The LOGSYN subprogram is brought into play by the appearance of a LOGIC statement. The operations indicated in FIGS. 7 and 8 serve to interpret the LOGIC statement and are such that the simple logic statement "A or B" of TABLE I may be interpreted as well as more involved logic combinations.

In step 178 the logic statement is scanned from its beginning to determine whether or not all parenthesis within the logic statement are balanced. While in the example there are no parenthesis involved, it will be understood that they may be encountered in other searches such as, for example, (*b* or (*a* and *b*)) and *c*. Following step 178, the XLAT subroutine 135 is again employed. If all blanks are encountered in the logic statement, then, in response to step 179, a message "incomplete statement" is sent in step 180, and the operation returns to getparm 102.

In step 181, if the logic statement is of alpha character, then the operation follows path 182 and in step 183 check is made to see if the logic statement is "and," in step 184 for "not," and in step 185 for "or." if an "and " is encountered, then an asterisk is moved to the output, merely to change the alpha designation "and" to a symbol *, step 186. In step 187, a "-not" is converted to the symbol >. In step 188 an "or" is changed to the symbol +.

The operation then follows a path 189 to the XLAT subroutine 135. If neither an "and" or "or" is encountered, then the operation follows path 190 to move the character encountered to the output area as indicated in step 191. Then, as indicated by channel 192, the scan in XLAT subroutine 135 is continued for succeeding characters.

In step 193, if all blanks are not encountered, then in step 194 a check is made to detect any alpha characters. If alpha characters are detected, then, as indicated by path 195, the operation returns to step 183 and the process is repeated. If alpha characters are not encountered, then the operation proceeds as indicated by path 196 to check, in step 197, whether or not a symbol "(" is encountered. If the answer is yes, then a 1is added to a parenthesis-balance counter in step 198. If a "(" is not encountered, then in step 199 a check is made to see if a symbol ")" is encountered. If a ")" is encountered, then a 1 is subtracted from the parenthesis-balance counter in step 200. If a ")" is not encountered, then, as indicated by channel 201, the operation proceeds to step 191. In step 202, the parenthesis-balance counter is checked to see if it is zero. If it is not zero, then the operation proceeds as indicated by path 201. If it is zero, then, in step 203, a message "unbalanced parenthesis" is transmitted to the user and the operation returns to getparm.

If, in step 193, all blanks are encountered, then, in step 204, a blank is moved to the output to signify termination. Thereafter, a check is made in step 205 to determine if all parenthesis in the logic statement are balanced. If not, then the message of step 203 is made effective and the operation shifts to getparm. If the parenthesis are balanced, then the operation shifts to step 210 where, starting at the beginning of the logic statement, the XLAT subroutine 135 again is employed to check for non blanks.

In step 211, a check for the existence of alpha characters is made. If no alpha characters are detected, then, in step 212, a check is made for a "(", in step 213 a check is made for a ¬. In step 214, a check is made to see if two contiguous "¬" have been encountered and if two have been encountered, then, as indicated by path 215, step 216 transmits a message "invalid logic" to the user and the operation returns to get-parm. If a "(" is encountered in step 212, then the operation shifts to step 217 where the operation is directed by channel 218 to the XLAT subroutine to check the second character in the logic statement.

If a "¬" is not encountered in step 213, a check is made in step 219 to determine the existence of a blank. If a blank is encountered in step 219, then a check is made in step 220 to see if a previous character was a ")". If either no blank is encountered in step 219 or if no ")" was previously encountered, then the operation shifts to step 216 to signal an invalid logic message. However, if in step 220, the previous character was a ")" or an alpha character, then the LOGSYN subroutine exits back to the output of step 107, FIG. 1.

If, in step 211 an alpha character is encountered, then, in step 230, having encountered a variable, the operation shifts to the second character in the logic statement. In step 231, a check is made to see if the next character in the logic statement is a "+" or an "*". If either a "+" or an "*" is encountered in the next symbol, then in step 217 the operation is continued by path 218 to XLAT 135. If the next symbol is not a "+" or an "*", then in step 232 a check is made to see if the next symbol is a ")". If it is not a ")", then the operation shifts to 219, 220 and exits. If an exit symbol is a ")", then the operation shifts in accordance with path 233 back to step 230 to check for a determination of the symbol following ")".

FIGURES 1—2

Figure 8:
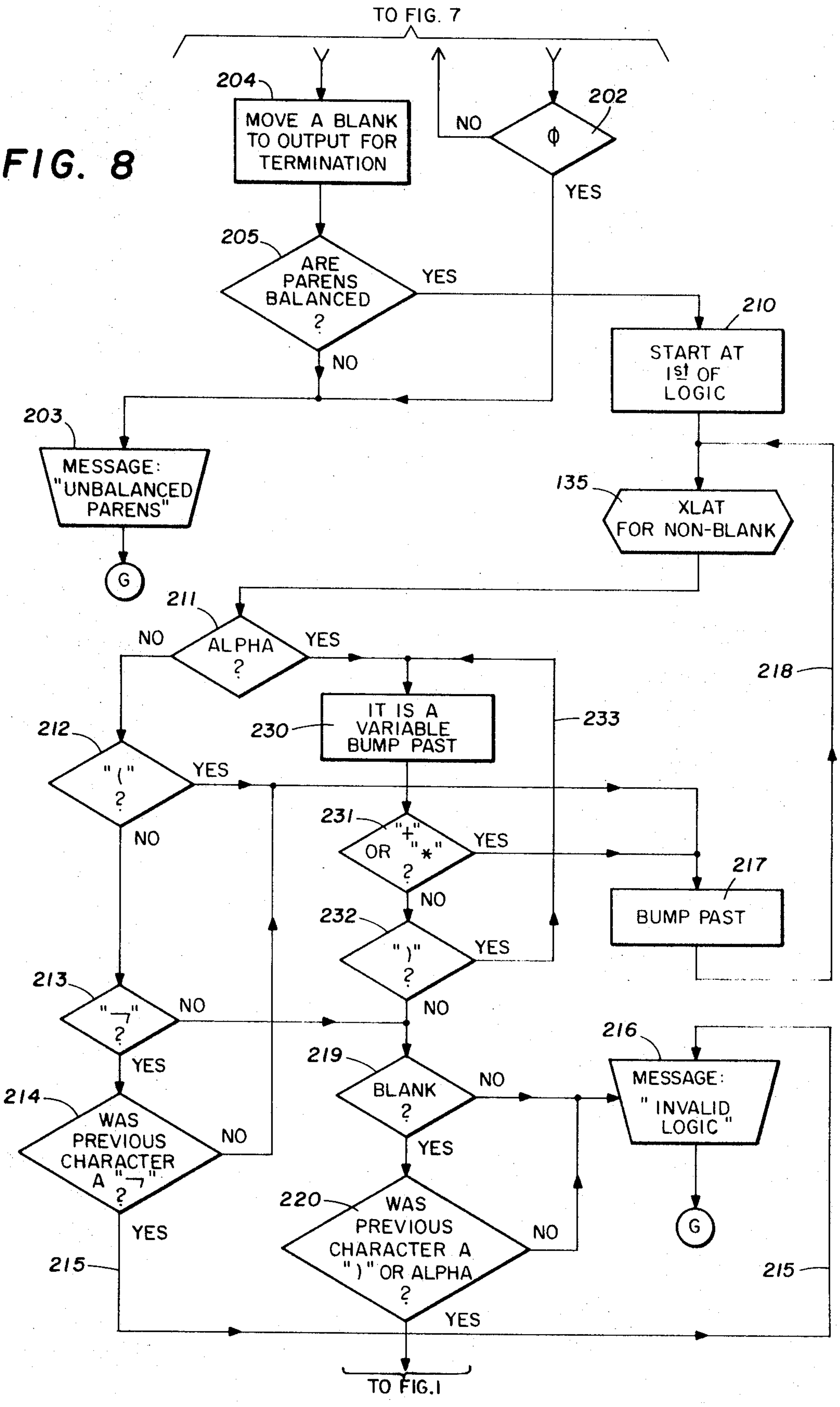

It will be remembered that in FIG. 8 the exit from the LOGSYN subroutine was at step 220 and was dependent upon a finding that the previous character was a ")" or an alpha character.

In FIG. 1, having built the profile in step 105 and having interpreted the logic statement in the LOGSYN subroutine 107 the operation now proceeds to apply the variables in the logic statement to the data base.

In accordance with the flow chart shown in FIG. 1 following the LOGSYN step 107, the step 250 involves reading the first record in the selected record file which includes the file control record and contains the bounds of the file. In step 251 the first record in the record file is read. This is the file control record which contains the bounds of the file. In step 253, the next record in the file is read. This is the first data stored in the data base, the first raw data to which the variables and the logic statement are to be applied. In step 500, later to be considered, a check is made to see if the end of the file (data base) has been reached. If not, then, in step 254, the first record is checked to see if it includes a symbol indicating that the user has heretofore designated this particular record and that this part of the data base to be ignored or deleted from further considerations. If it has been deleted, then the operation returns to step 253 to read the next record. If it has not been deleted, then in step 255 a check is made to see if the first record is of proper form, i.e., the proper form name actually stored in the record.

In step 256, a counter for the first entry in the profile is initialized, being set to zero. In step 257, 258 and 259, checks are made on the status of the entries in the profile. More particularly, in step 257, a check is made to see if the profile entry is at the end of the profile as originally stored in step 114. In step 258, a check is made to see if this profile entry is active as indicated in step 115. If the entry of the profile is not active, then in step 259 the operation is returned to the second profile entry and points to the second counter rather than the first counter as in step 256.

In step 260, a search is made in the record to see if the label (the title in the present example) is actually contained in the document. The contents of the title are to be scanned to see if the word "evaporite" is contained therein. This search is a binary search to determine the existence of a field labeled "title." In step 261, a check is made to see if the title code was actually found in the record. If it was, then in step 262 a check is made to see if the operation to be conducted is "existence" as determined in step 142. If a title is found to exist in the first record, then in step 263 this profile entry is set as being true. In step 264 a one is added to the counter for the first profile entry. In step 265, provision is made for restoring special end blank characters that may be encountered at the ends of a given field. Following step 265, the operation returns as indicated by path 266 to step 259 which returns the operation to step 257 where a check is again made to see if the end of the profile has been reached.

Following step 261, if a code is not found, then, in accordance with channel 267, the profile entry is set to "false" in step 268, and then the operation proceeds to step 265.

In step 262, if the operation is not to be "existence" then, in step 269 a check is made to see if the label "title" actually includes a marker "<" to indicate associated text which is actually the title material. That means that in step 262, if the user desires not merely to determine if the title exists but if he wants to know more about the title, that is, its contents, then, in accordance with step 269, a check is made to see if there is text material comprising the title. If there is not, then the operation passes to step 268. If the title does have text material, then, in step 270, the "<>" are located and special blanks are inserted. More particularly, the characters immediately preceding and immediately following the "<>" which delimit the title are stored. Following step 270, a check is made in step 271 to see if the operation is to be in the word mode as previously designated in step 141*a*. If the operation is to proceed in the word mode, then in step 272 a check is made to determine whether or not the operation is to be in the "word range" or for the discovery of the exact word. If the operation is to cover a word range, then, in step 273, a table is built for the first character in the first word of the word range. If the operation is in the word mode and is to require location of the exact word (EQ), then, in step 274, a scan table is built for the first character of the word to be located.

In step 275 the text of the title is scanned to detect the existence of the first character of the word. If the first character of the word is found as checked in step 276, then a check is made in step 277 to again determine if the operation is to be based upon a range or an equal match. If it is to be equal, then, in step 278, a comparison is made to determine if the desired word is present. If the word is present, then, as indicated by channel 279 the operation shifts back to step 263. If the word is not the same, then in step 280, the operation moves from the first word in which the first character of the desired word was found and as indicated by channel 281 returns to step 275.

In step 276, if the word was not found, then, as indicated by channel 282, the operation returns to step 268.

In step 277, if the operation is to be based upon "range" then, in step 283, a check is made to see if the word located is within the range. If it is, then the operation returns by way of path 279 to step 263. If the word is not within the desired range, then the operation moves to step 280 and the search moves to the next word in the title which has the proper first character.

Returning now to step 271, if the operation is not to be in the "word" mode, then, in step 285, the title is scanned to locate the first number within "<>". If any number is found, as checked in step 286, then, in step 287, a check is made to see if the operation is to be "equal" as determined in step 147. If it is to be operation "equal" then, in step 288, a check is made to see if the number canonized and stored is equal to the first number detected in the "<>". If it is, then the operation proceeds along channel 279 to step 263. If the number is not equal, then the operation proceeds along channel 282 to step 268.

If, in the operation in step 287, it is determined that it is not to be equal, then, in step 300, a check is made to see if the operation is to be "greater than." If the operation is to be "-greater than," then, in step 301, a check is made to see if the number canonized is greater than the number identified in the text of the title. If it is, then the operation proceeds along channel 282 to step 263. If it is not, then the operation proceeds along channel 282 to step 268.

If, in the operation in step 300, it is determined that it should not be "greater than," then, in step 302, a check is made to see if the operation is to be based upon a "less than" comparison.

If it is, then, in step 303, a check is made to see if the number canonized is less than the first number identified in the title text. If it is, then the operation proceeds along path 279 to step 263. If it is not, then the operation proceeds along path 282 to step 268.

If step 302 of the operation is not to be "less than," then, in step 304, a check is made to see if the number canonized and stored is within the range. If it is, then the operation proceeds along path 279 to step 263. If it is not, the operation proceeds along path 282 to step 268.

Ultimately, when the end profile is reached as detected in step 257, the operation proceeds to the LOGIC subprogram designated by the reference character 310.

It will now be seen that in the foregoing operation each time a profile entry was found to be true, a truth value was set in the profile in accordance with step 263. Each time a profile entry was found to be false, a truth value was set in accordance with step 268. Thus, truth values have been added to the profile. So far as the operations thus far explained are concerned, the profile A and B of the example have been modified by adding truth values thereto. More particularly, if the word "evaporite" appeared in the title, then a truth value of 1 would be added to this part of the profile. If the word "evaporite" appeared in the list of terms stored in memory for the first record, then the B portion of the profile would be modified by adding a truth value of 1 thereto. If the word "evaporite" was not found in the title or if it was not found in the list of terms, then the A and B portions of the profile would be set to zero, respectively. FIGURE FIG. 9

Figure 2:
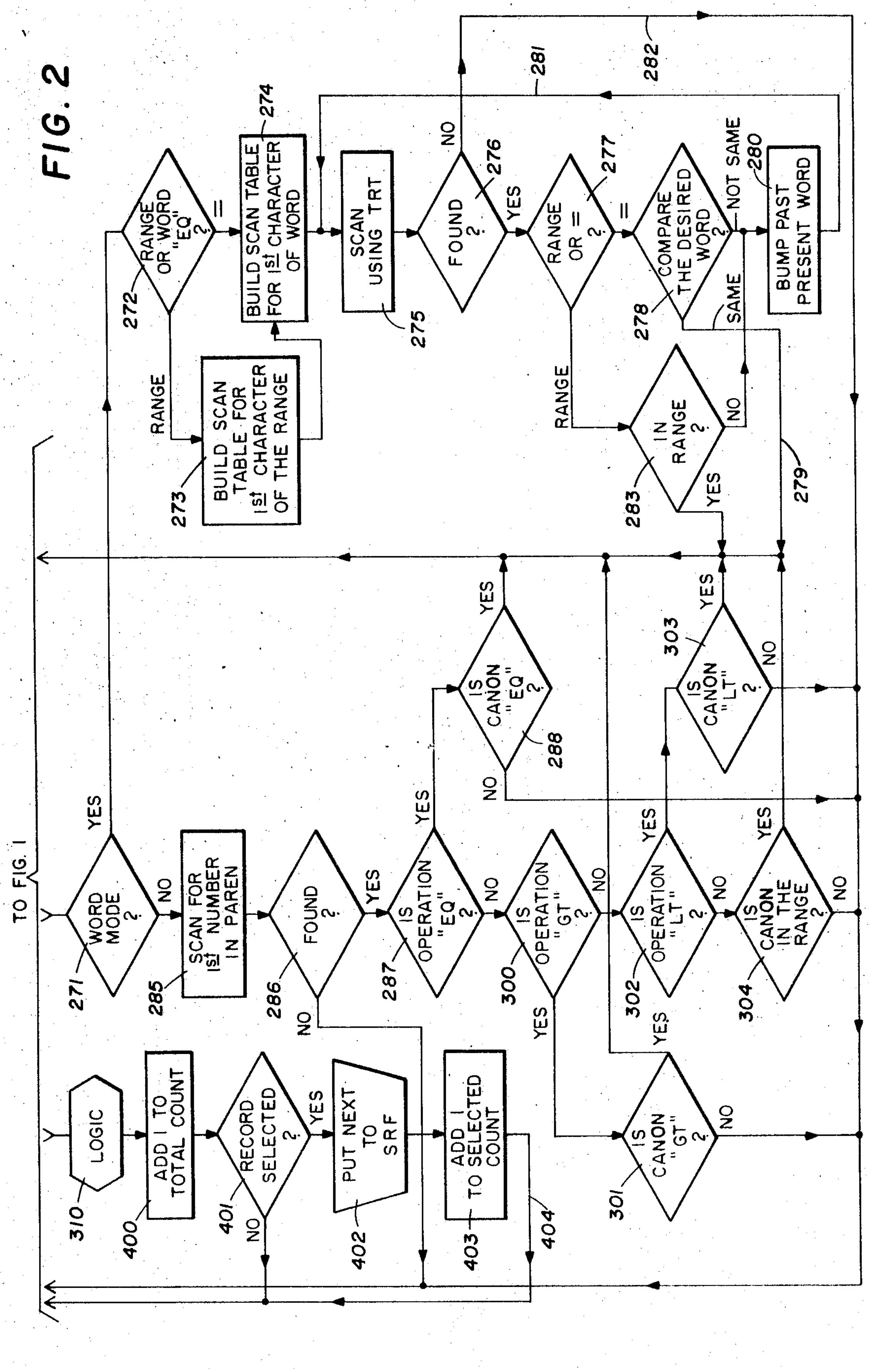
Figure 3:
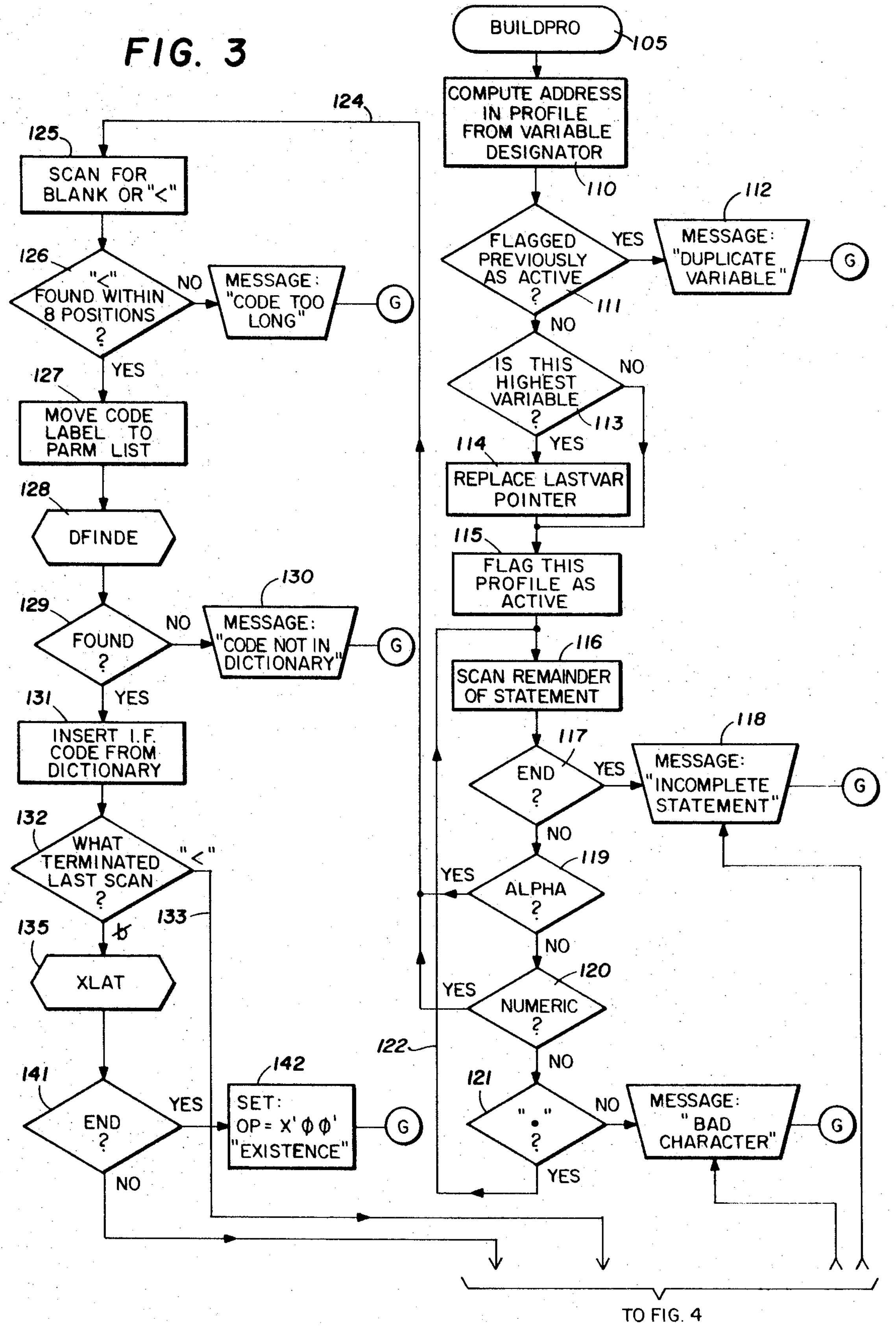
FIGS. 3–5 illustrate the construction of a profile (BUILDPRO) from instructions applied to the computer system from a given input terminal.

The operation to be carried out in connection with the logic step 310, FIG. 2, is to apply the logic requirements of the example (A or B) to the modified profile. More particularly, referring to FIG. 9, in step 320, the logic (A and B) is moved to a "logsave" area of storage. In step 321, the logic statement is scanned for an alpha character or for a blank. In step 322 a check is made to see if there is a blank at the end of the logic statement. If there is no blank at the end of the logic statement, then, in step 323, the displacement of this variable in the profile is computed. In step 325, the variable is replaced by the truth value (zero or one) and the operation returns to step 321.

In step 322, if a blank is encountered at the end of the logic statement, then, in step 326, a reduction switch or logic analysis operation is initialized. In step 327, the logic statement is interpreted beginning with the first position. In step 328, the logic statement is scanned for a "¬". In step 329, a check is made to see if a "¬" was found. If a "¬" was not found, then, in step 330, a start is made at the first of the logic statement and in step 331 it is scanned for a "+" or an "*". In step 332, a check is made to see if either a "+" or an "*" was found. If either of the above symbols were found, then, in step 333, the reduction switch is changed to indicate the presence of a "+" or "*". In step 334, a check is made to see if the previous character in the logic statement was a ")". If the previous symbol was not a ")", then, in step 335, a check is made to see if the symbol following is a "(". If the symbol following is not a "(", then, in step 336, a check is made to see if the symbol under consideration is an "*". If the symbol under consideration is not an "*", then, in step 337, an output is provided which represents the "logical or" of two truth values. If the symbol under consideration is an "*", then, in step 338, the "logical and" of two truth values is provided. The output from steps 337 and 338 are employed in step 339 to shift the logic statement to further reduce the same in dependence upon successive portions of the logic statement. If the results of the checks in either of steps 334 or 335 were true, then the operation as indicated by path 340 leads to step 331. Similarly, upon shifting the logic statement in step 339, the operation leads to step 331.

In step 329, if a "¬" is found, then, in step 350, the reduction switch is then set to indicate the presence thereof. In step 351 a check is made to see if a "¬" immediately precedes a "(" and if it does not, then the truth value is complemented in step 352 and in step 353 the scanning of the logic statement precedes beyond the "¬."

In step 351, if a "¬" precedes a "(", then the operation returns to step 328.

In step 332, if a "+" or "*" is not found, then, in step 360, the logic statement is scanned from its beginning and, in step 361, a scan is made to detect a "(". In step 362 a check is made to see if a ")" is found. If a "(" is found, then the reduction switch is set to so indicate, in step 363. In step 364, a check is made to see if the contents of the parenthesis is a single variable or a multiple variable. If it is a single variable, then, in step 365, the operation proceeds beyond the two parenthesis. If it is not a single variable, then, in accordance with path 366, the operation proceeds back to step 361.

In step 362, if a "(" is not found, then, in step 370, a check is made to see if the reduce switch is so set as to indicate that previously a "(" had been found and, if so, then, as indicated by path 371, the operation proceeds back to step 326. If it had not, then, in step 372, the truth value that remains from the reduction of the logic statement then appears at the output of the logic step 310, FIG. 2.

The operation thus performed is to apply the logic statement to the truth values in the profile and then indicate, by the status at the output of step 310, whether or not the first record included the word "evaporite" in either the title or the list of terms of the first document.

In step 400, FIG. 2, a one is added to the total count of the number of documents processed. In step 401, a check is made to see if the output of the logic subprogram 310 is a one or a zero. If it is a one, then in step 402 the address of the first record thus selected is stored in the selected record file. In step 403 a one is added to the counter which records the number of records selected and in accordance with channel 404 the operation returns to step 253 where the next record is then processed.

If the output of the logic subroutine 310 results in a zero, then the operation returns by way of path 404 to step 253.

The results of the search may then be provided on an output display and may comprise the information set forth in Table II.

For the example of Table I, the results of Table II portray the utility of the system.

After having processed all of the documents in a given data base, there will be stored in memory the addresses of all of the documents which satisfy the select criteria. Thereafter, if further search is desired, the operation may continue but be limited readily only to the subset which satisfy the search criteria. More particularly, in FIG. 1, step 500 indicates that the check is made to see if the search has reached the end of the file comprising the data base. If the answer is no, then the operation continues past the step 500 to step 254 as above described. If the file has been exhausted, then, in step 501, a check is made to determine whether or not a search through the subset that satisfied the initial search criteria is desired. If the answer is yes, then the operation returns back to the initialize step 101. For example, the user may now further constrain the selected subset of records by performing the operation ITERATE. The user may select one of the available processors, LIST, COPY, etc. The user may pose a *new* question to the total data base, i.e., SELECT. The user may exercise these options by replying "YES" or "NO" to the ITERATE question. A yes reply indicates the user wishes to enter another question further *total* data collection or that one of the available processors will be used.

If the ITERATE option is chosen, the user will then enter the variables and LOGIC statement for a constraining question in the same manner as he did for the initial question. The following example illustrates a question entered as a result of taking the ITERATE option specified in the first example.

TABLE III

| | | | |
|---|---|---|---|
| A. TITLE * PERMIAN" TITLE | | | |
| B. TERMS * PERMIAN" TERMS | | | |
| C. ABSTR * PERMIAN" ABSTRACT | | | |
| LOGIC A OR B OR C | | | |
| SEARCHED | 103 | | |
| SELECTED | 17 | SUBSET | 2 |
| VARIABLES SATISFIED | | | |
| A | 12 | | |
| B | 16 | | |
| C | 1 | | |

In this example, TABLE III includes not only the profile but the results. Note that three variable designators are used and the word search is based upon the word "permian." Of the 103 records selected in the operation specified by TABLE I, 17 records were found to be of interest as limited by the variables in TABLE III.

In connection with step 501 leading to step 101, in the initialization involves the new search parameters superimposed on the selected record file.

By this means, the system accommodates iteration operations based upon new parameters and new logic and provides a powerful tool for the retrieval of documents which satisfy criteria that may be imposed conversationally by the user upon the computer system via a user control of a console.

Having described the flow of operations involved in the system in connection with the foregoing FIGS. 1–9, there will now be described the overall system as shown in FIG. 10 and the QUESTRAN interrogation portion of the system as shown in FIG. 11. By referring to these Figures, in connection with FIGS. 1–9, the setting for the operations of FIGS. 1–9 will be understood.

FIG. 10

In FIG. 10, step 550 indicates that data input to the system is cast into a format such as above described. This is then employed in step 551 to form a selected record file. A dictionary is formed as an input as indicated as step 552 and a dictionary listing as step 553. Thus, the dictionary building is carried out in step 554 in conjunction with the completion of the selected record file as indicated in step 555. In step 556, keys are provided for correcting errors which have been noted in step 557. An error list is also provided as indicated in step 558 as a part of the record-building operation indicated by step 559 wherein the Gipsy files as indicated in step 560 are completed whereupon the system is ready for operation in response to QUESTRAN as indicated in step 561.

Existing data, either on cards 562, tape 563, or disc 564, are provided and entered into the system through a convert program 565, whereby the input images may be entered into the system as indicated at 566. Original source documents 567 may be introduced into the system through a key-punch source or otherwise as indicated by step 568.

FIG. 11

With the files completed, a question is then posed to the system as indicated by step 570 conversationally, if desired, via a console keyboard. As indicated in step 571, the question specifies the variables in logic. Thereafter, as indicated in step 572, the search is made in the data depository in order to select the desired documents.

As indicated in step 573, a subset of data is provided from the selected record file. A question is then posed as to whether or not the results are adequate as indicated in step 574. If the results are adequate, then the question is asked as to whether or not the data is to be further processed as indicated in step 575. If the answer is no, then the operation is terminated. If the answer is yes, then the output can be printed, listed or copied as indicated in step 576. If the results are not adequate as indicated in step 574, then the question is asked as to whether or not the question is to be rephrased, as indicated in step 580. If the question is rephrased, then the operation shifts to the subset. If the question is not to be rephrased, then a new question is formulated as indicated by path 581. In the questran system the communication is via a console keyboard so that the operation may function with the versatility necessary to carry out multiple iteration on subsets of documents as may be specified by the user.

In order further to provide an understanding of the system, three tables are provided hereinafter which, in OS/360 Assembler Language, set out the instruction list for the SELECT routine, the LOGSYN routine, and the LOGIC routine. More particularly, Table IV details the SELECT operation; Table V details the LOGSYN operation; and Table VI details the LOGIC operation.

TABLE IV

```
CT PHASE1.BUILDPRO

STMT   SOURCE STATEMENT

 512 ******************************************************************
 513 *
 514 *   BUILDPRO - ROUTINE
 515 *
 516 *   PURPOSE - INITIALIZES THE PROFILE
 517 *
 518 *   SPECIFICATIONS - INTERPRETS PARAMETER CARDS, CHECKS FOR
 519 *                    SYNTACTICAL ERRORS AND SETS THE OPERATION
 520 *                    FLOW CONTROL. TRANSLATES CODES, MOVES INFO
 521 *                    TO THE PROFILE AND ZEROS OUT THE VARIABLE
 522 *                    ENTRIES KEPT IN COMMON.
 523 *                    USES R0,R1,R2,R5,R9,R14,R15
 524 *
 525 ******************************************************************

 527 BUILDPRO SR     R2,R2            ZERO OUT HIGH BITS
 528          TRT    0(1,R9),VARTAB   VARIABLE DISPLACEMENT
 529          BCTR   R2,0             REDUCE BY ONE
 530          SLL    R2,2             DISPLACEMENT FOR COUNT IN COMMON
 531          ST     R2,VARLSV        SAVE CORE LOC TILL LATER
 532          SLL    R2,4             DISPACEMENT FOR VARIABLE
 533          LA     PROF,PROTAB(R2)  ADDR OF PROFILE ENTRIES
 534          USING  PROD,PROF        ADDRESSABILITY FOR PROFILE DSECT
 535          TM     PROFLG,X'80'     ENTRY ALREADY USED
 536          BNO    LASTEST          NO

 538          MVC    MSGLINE,DUPVAR    DUPLICATED VARIABLE
 539          BAL    R6,MSGPRT
 540          B      SNERSET          FLAG ERROR AND PROCEED

 542 LASTEST  LA     R9,1(R9)         BUMP LOOK POSITION
 543 SCANE    BAL    R14,XLAT         SCAN ROUTINE

 545          B      BDCRD            END
 546          B      MORECHAR         OTHER
 547          B      BLDCDE           ALFA

 549 BDCRD    MVC    MSGLINE,INCOMCD  INCOMPLETE CARD
 550          BAL    R6,MSGPRT
 551          B      SNERSET          SET ERROR AND GO ON
```

TABLE IV (cont.

CI.PHASE1.BUILDPRO

```
STMT    SOURCE STATEMENT

553 BADCHAR  MVC   MSGLINE,INVLCRD   BAD CHARACTER
554          BAL   R6,MSGPRT

556 SNERSET  EQU   *
557          B     GETPARM           PROCEED

559 MORECHAR CLI   0(R9),C'0'        IS IT NUM
560          BL    CHKPERD           NOT NUM
561          CLI   0(R9),C'9'        IS IT NUM
562          BNH   BLDCDE            IT'S A CODE
563 CHKPERD  EQU   *
564          CLI   0(R9),C'$'        SAME?
565          BE    SAMELBL
566          CLI   0(R9),C'.'        PERIOD???
567          BNE   BADCHAR           NO

569          LA    R9,1(R9)          BUMP LOCATION
570          B     SCANE             SCAN AGAIN

572 SAMELBL  CLC   LASTVAR,=X'FFFFFFFF'  1ST VAR?
573          BE    BADSAME           YES

575          L     R6,SAMESV
576          MVC   PROIF,4(R6)       USE SAME LABEL
577          LA    R9,1(R9)          BUMP SCAN
578          B     NOCLR             CONTINUE PROCESSING

580 BLDCDE   TRT   0(8,R9),LPARTAB SCAN FOR BLANK OR LT PAREN
581          BZ    CTOOLNG           CODE TOO LONG

583          MVC   DFCODE,BLANKS     BLANK IT OUT
584          LR    R2,R1             SAVE THIS
585          SR    R1,R9             CODE LENGTH
586          BCTR    R1,0            DECRE FOR MOVE
587          EX    R1,CODEMOVE       MOVE IT
588          LR    R9,R2             BUMP SCAN LOC
589          L     R15,ADFINDE       ADDR OF SUBR
590          LA    R1,DFPARM         PARM LIST
591          BALR  R14,R15           SPECIFIC CODE LOOK WITH DFIND

593          LTR   R1,R1             CODE FOUND?
594          BNZ   INSERT            YES

596          MVC   MSGLINE,NOCODE    CODE NOT IN DICTIONARY
597          BAL   R6,MSGPRT
598          B     SNERSET           BLAST IT

600 CTOOLNG  MVC   MSGLINE,TOLONG    CODE TOO LONG
601          BAL   R6,MSGPRT
602          B     SNERSET
```

TABLE IV (cont)

```
CT.PHASE1.BUILDPRO

STMT    SOURCE STATEMENT

604 INSERT    EQU    *
605           USING  DICDSECT,R1    ADDRESSABILITY FOR DICTIONARY
606           MVC    PROIF,DIF

608           MVI    CTPRT,C' '       BLANK OUT
609           MVC    CTPRT+1(60),CTPRT  THE PRINT AREA
610           LH     R2,CTCOUNT       CLEAR TEXT COUNT
611           LTR    R2,R2            IS COUNT ZERO ?
612           BZ     NOCLR            YES, SKIP EVERYTHING
613           BCTR   R2,0             DECRE FOR MOVE
614           EX     R2,CTMOVER       MOVE THE CLEAR TEXT
615           GETPUT FILE=1,PROC=2,DATA=CTAREA    PRINT IT
616+*                                 GIPSY CALL TO COMIO
617+          L      15,ACOMIO
618+          LA     1,GIPL0007
619+          B      GIP0007
620+GIPL0007  DS     0F
621+          DC     A(CTAREA)
622+          DC     F'0'
623+          DC     H'0'
624+          DC     H'1'
625+          DC     H'2'
626+GIP0007   BALR   14,15

628 NOCLR     EQU    *
629           CLI    0(R9),C'$'       SAME?
630           BE     SAME
631           CLI    0(R9),C' '       BLANK TERMINATED LAST SCAN ?
632           BNE    PARENER          NO

634           BAL    R14,XLAT         CONTINUE SCAN

636           B      EXISTANC         END
637           B      MODETEST         OTHER
638           B      NUMODEA          ALFA

640 EXISTANC  MVI    PRCOP,X'00'      ZERO OP CODE IN PROFILE
641           B      OKVAR            GETOUT OF BLDPRO

643 MODETEST  CLI    0(R9),C'<'       LEFT PAREN?
644           BNE    RANGES           NO

646 PARENER   TRT    0(30,R9),RIGHTAB
647           BNZ    PMOVER

649 NORIGHT   MVC    MSGLINE,PTOLONG  SEARCH PAREN TOO LONG
650           BAL    R6,MSGPRT
651           B      SNERSET          MOVE ALONG
```

TABLE IV (cont)

```
:CT.PHASE1.BUILDPRO

STMT    SOURCE STATEMENT

 653 PMOVER    LR     R2,R1              GET ADDR
 654           SR     R1,R9              LENGTH OF PAREN PLUS ONE
 655           BCTR   R1,0               MINUS ONE
 656           STC    R1,PROLNG          PROF  TARGET LENTH
 657           BCTR   R1,0               GET READY FOR EXECUTE
 658           EX     R1,SPMOVE          MOVE IT

 660           LA     R9,1(R2)           POINT PAST RIGHT PAREN
 661           BAL    R14,XLAT           LOOK FOR THRU

 663           B      NOMOREP            END
 664           B      TACTICER           OTHER
 665           B      RANCHECK           ALFA

 667 NOMOREP   MVI    PROOP,X'04'      WORD SEARCH
 668           B      OKVAR              GETOUT OF BLDPRO

 670 RANCHECK  CLC    0(4,R9),=C'THRU' RANGE?
 671           BE     PSCAN2             YES

 673 TACTICER  MVC    MSGLINE,TACTERR  BAD SYNTAX
 674           BAL    R6,MSGPRT
 675           B      SNERSET

 677 PSCAN2    LA     R9,4(R9)           BUMP PAST 'THRU'
 678           BAL    R14,XLAT           GO LOOK'N FOR 2ND PAREN

 680           B      NORANGE            END - MISSING PAREN
 681           B      WHATSIT            OTHER - MAY BE 2ND PAREN
 682 NORANGE   MVC    MSGLINE,BADRNGE    GET BAD RANGE MSG
 683           BAL    R6,MSGPRT          GO PRINT IT
 684           B      SNERSET            SET SYNTAX SWITCH

 686 WHATSIT   CLI    0(R9),C'<'         WAS IT A LEFT PAREN ?
 687           BNE    NORANGE            NO, KILL IT

 689           TRT    0(30,R9),RIGHTAB SCAN FOR RT PAREN
 690           BZ     NORIGHT            NOT FOUND

 692           MVC    PROPER2,BLANKS     BLANK OUT 2ND TAGRET AREA
 693           SR     R1,R9              LENGTH PLUS ONE
 694           SH     R1,=H'2'         MOVE LENGTH MINUS 1 FOR EX
 695           EX     R1,OPMOVE          MOVE IT
 696           MVI    PROOP,X'08'      ALFA RANGE IN PROFILE
 697           CLC    PROPER1(29),PROPER2  IS RANGE IN ORDER ?
 698           BH     RNGFLIP            NO, REVERSED

 700           B      OKVAR              GETOUT OF BLDPRO

 702 RNGFLIP   MVC    MSGLINE,MIXRNGE  INVERTED RANGE MSG
 703           BAL    R6,MSGPRT
 704           B      SNERSET            SET ERROR AND CONTINUE

 706 NUMODEA   EQU    *
 707           CLC    0(3,R9),=C'EQ '  EQUAL?
```

TABLE IV (cont.)

```
CT.PHASE1.BUILDPRO

STMT   SOURCE STATEMENT

708             BNE    LESSTEST          TRY LESS THAN

710             MVI    PROOP,X'0C'       SET NUMERIC EQUAL OP IN PROFILE
711             B      FINDNUM           HUNT FER CIPHER

713 SAME        CLC    LASTVAR,=X'FFFFFFFF'  1ST VARIABLE?
714             BE     BADSAME           YES
715             L      R6,SAMESV         GET ADDR OF PREVIOUS VARIABLE
716             MVC    PROOP(2),2(R6)    SAME OPERATION
717             MVC    PROPER1(58),6(R6)       SAME FIELDS
718             B      OKVAR             THAT'S  ALL
719 BADSAME     MVC    MSGLINE,NORELAT   MESSAGE
720             BAL    R6,MSGPRT
721             B      GETPARM

723 LESSTEST    CLC    0(3,R9),=C'LT '   LESS?
724             BNE    GRATEST           TRY GREATER

726             MVI    PROOP,X'14'       NUMERIC LESS THAN
727             B      FINDNUM           HUNT FER CIPHER

729 GRATEST     CLC    0(3,R9),=C'GT '   GREATER?
730             BNE    BADNUMBR          ERROR,SOMEBUDDIES CANT SPELL

732             MVI    PROOP,X'10'       NUMERIC  GREATER THAN

734 FINDNUM     LA     R9,3(R9)          BUMP PAST  RELATION
735 PASTBLNK    CLI    0(R9),C' '        IS IT BLANK
736             BNE    ISITNUM           WE'VE HIT SOMETHING

738             LA     R9,1(R9)          BUMP
739             B      PASTBLNK          LOOP

741 RANGES      MVI    PROOP,X'18'       NUMERIC RANGE
742             CLI    0(R9),C'$'        SAME?
743             BE     SAME

745 ISITNUM     LR     R1,R9             GET DATA ADDR
746             L      R15,=V(NUMBER)    ADDR OF SUBPROGRAMME
747             BALR   R14,R15           GO TO IT

749             B      BADNUMBR          INVALID NUMBER
750             CLI    PROOP,X'18'       MORE?
751             MVC    PROPER1(9),0(R1)       STORE CANONICAL IN PROFILE
752             BNE    OKVAR             NO

754 KEEPLOKN    CLI    0(R9),C' '        IS IT  BLANK YET
755             BE     LOOKTHRU          IS IT  'THRU'

757             LA     R9,1(R9)          BUMP
758             B      KEEPLOKN          CONTINUE  PLEASE

760 LOOKTHRU    BAL    R14,XLAT          SCAN FOR 'THRU'
761             B      BDCRD             INCOMPLETE CARD - END
762             B      BADCHAR           WHAT'S THIS  - OTHER
```

TABLE IV (cont)

```
:CT.PHASE1.BUILDPRO

STMT   SOURCE STATEMENT

 764            CLC   0(5,R9),=C'THRU '   IS IT
 765            BNE   BADNUMBR          INVALID NUMBER

 767            LA    R9,5(R9)          BUMP PAST
 768 NOTYET     CLI   0(R9),C' '        HAVE WE ENCOUNTERED A NUMBER
 769            BNE   SECNDNUM          GET 2ND NUMBER

 771            LA    R9,1(R9)          BUMP
 772            B     NOTYET            WHERE IS IT

 774 SECNDNUM   LR    R1,R9             GET DATA ADDR
 775            L     R15,=V(NUMBER)    ADDR OF SUBPROGRAMME
 776            BALR  R14,R15           GO TO IT

 778            B     BADNUMBR          INVALID NUMBER
 779            MVC   PROPER2(9),0(R1)  STORE CANONICAL IN PROFILE

 781            CP    PROPER1(9),PROPER2(9)   ARE THEY IN RIGHT ORDER
 782            BH    RNGFLIP           INVALID ORDER OF RANGE

 784 OKVAR      OI    PROFLG,X'80'      FLAG VARIABLE AS USED
 785            L     R2,VARLSV         RESTORE CORE LOC OF VAR COUNT
 786            SR    R5,R5             ZERO
 787            ST    R5,PROCNT(R2)     ZERO COUNT OF A USED VARIABLE
 788            ST    PROF,SAMESV       SAVE VARIABLE LOCATION FOR 'SAME
 789            C     PROF,LASTVAR      HIGHER VARIABLE THIS TIME?
 790            BL    GETPARM           NO, SKIP IT
 791            ST    PROF,LASTVAR      KEEP IT
 792            B     GETPARM           NEXT PARM ?

 794 BADNUMBR   MVC   MSGLINE,BADPARM   MSG
 795            BAL   R6,MSGPRT         GO PRINT IT
 796            B     SNERSET           GO SET SYNTAX
 797 *                      END OF BLDPRO
 798 CTMOVER    MVC   CTPRT(1),CLRTEXT
```

TABLE IV (cont)

```
CT.PHASE2

STMT    SOURCE STATEMENT

 800 *****************************************************************
 801 *****************************************************************
 802 *
 803 *  RECORD PROCESSING SECTION  -  2ND PHASE OF SELECT
 804 *
 805 *****************************************************************
 806 *****************************************************************

 808 PROCESS   EQU    *
 809           GETPUT   FILE=1,PROC=2,DATA=DUMLINE
 810+*                               GIPSY CALL TO COMIO
 811+          L       15,ACOMIO
 812+          LA      1,GIPL0008
 813+          B       GIP0008
 814+GIPL0008  DS      0F
 815+          DC      A(DUMLINE)
 816+          DC      F'0'
 817+          DC      H'0'
 818+          DC      H'1'
 819+          DC      H'2'
 820+GIP0008   BALR    14,15
 821           GETPUT FILE=1,PROC=2,DATA=BEGIN
 822+*                               GIPSY CALL TO COMIO
 823+          L       15,ACOMIO
 824+          LA      1,GIPL0009
 825+          B       GIP0009
 826+GIPL0009  DS      0F
 827+          DC      A(BEGIN)
 828+          DC      F'0'
 829+          DC      H'0'
 830+          DC      H'1'
 831+          DC      H'2'
 832+GIP0009   BALR    14,15
 833           GETPUT   FILE=1,PROC=2,DATA=DUMLINE
 834+*                               GIPSY CALL TO COMIO
 835+          L       15,ACOMIO
 836+          LA      1,GIPL0010
 837+          B       GIP0010
 838+GIPL0010  DS      0F
 839+          DC      A(DUMLINE)
 840+          DC      F'0'
 841+          DC      H'0'
 842+          DC      H'1'
 843+          DC      H'2'
 844+GIP0010   BALR    14,15
 845           CLI     ISWITCH,X'80'    SHALL WE  ITERATE
 846           BNE     RECPRO          I THINK NOT

 848           GETPUT FILE=6,PROC=3      REWIND SRF FOR ITERATION
 849+*                               GIPSY CALL TO COMIO
 850+          L       15,ACOMIO
 851+          LA      1,GIPL0011
 852+          B       GIP0011
 853+GIPL0011  DS      0F
 854+          DC      A(0)
```

TABLE IV (cont)

CT.PHASE2

```
STMT    SOURCE STATEMENT

855+            DC      F'0'
856+            DC      H'0'
857+            DC      H'6'
858+            DC      H'3'
859+GIP0011     BALR    14,15
860             B       ITSEAR            DO THE IT

862 RECPRO      GETPUT FILE=6,PROC=4 POINT BACK TO FIRST OF SRF FILE
863+*                                   GIPSY CALL TO COMIO
864+RECPRO      L       15,ACOMIO
865+            LA      1,GIPL0012
866+            B       GIP0012
867+GIPL0012    DS      0F
868+            DC      A(0)
869+            DC      F'0'
870+            DC      H'0'
871+            DC      H'6'
872+            DC      H'4'
873+GIP0012     BALR    14,15

875             GETPUT  PROC=3,FILE=5      GET 1ST FOR  RECORD FILE
876+*                                   GIPSY CALL TO COMIO
877+            L       15,ACOMIO
878+            LA      1,GIPL0013
879+            B       GIP0013
880+GIPL0013    DS      0F
881+            DC      A(0)
882+            DC      F'0'
883+            DC      H'0'
884+            DC      H'5'
885+            DC      H'3'
886+GIP0013     BALR    14,15
```

TABLE IV (cont)

CT.PHASE2

```
STMT    SOURCE STATEMENT

888 ****************************************************************
889 *
890 *  SELECT LOOP  -  EXECUTED FOR EACH RECORD PROCESSED
891 *
892 ****************************************************************

894 SELLOOP   CLI   ISWITCH,X'80'     ITERATE?
895             BNE   SEQSEAR           NOPE

897 ITSEAR    GETPUT  FILE=6,PROC=1,PARM=SRFPARM  GET NEXT SR
898+*                                  GIPSY CALL TO COMIO
899+ITSEAR     L      15,ACOMIO
900+           LA     1,GIPL0014
901+           B      GIP0014
902+GIPL0014   DS     0F
903+SRFPARM    DC     A(0)
904+           DC     F'0'
905+           DC     H'0'
906+           DC     H'6'
907+           DC     H'1'
908+GIP0014    BALR   14,15
909            L      REC,0(R1)         DATA ADDR
910            LTR    REC,REC           EOF ON SRF?
911            BZ     COMPLETE          YES INDEEDY

913            ST     REC,SAVSRF        SAVE DATA ADDR
914            MVC    PSRF+4(6),SRFPARM+4     TTR AND REL REC
915            ST     REC,CHPTHIS
916            MVC    CHPTHIS+4(6),SRFPARM+4    TO REWRITE WITH SUBSET

918            USING  RECDSECT,REC
919            TM     RFLAGS,X'80'      DELETED FROM SRF?
920            BO     ITSEAR            YES GET ANUDDER ONE
921            MVC    GTPARM+4(6),RELPAREN    TTR AND RR FROM SRF

923            GETPUT FILE=5,PROC=5,PARM=GTPARM    GET THIS SR
924+*                                  GIPSY CALL TO COMIO
925+           L      15,ACOMIO
926+           LA     1,GIPL0015
927+           B      GIP0015
928+GIPL0015   DS     0F
929+GTPARM     DC     A(0)
930+           DC     F'0'
931+           DC     H'0'
932+           DC     H'5'
933+           DC     H'5'
934+GIP0015    BALR   14,15
935            L      REC,0(R1)         DATA ADDR
936            B      ONWITHIT          CONTINUE TO PROCESS
937 SEQSEAR   GETPUT  PROC=1,FILE=5,PARM=RECPARMS  GET NEXT  RECORD
938+*                                  GIPSY CALL TO COMIO
939+SEQSEAR    L      15,ACOMIO
940+           LA     1,GIPL0016
941+           B      GIP0016
942+GIPL0016   DS     0F
```

TABLE IV (cont)

CT.PHASE2

```
STMT    SOURCE STATEMENT

943+RECPARMS DC    A(0)
944+         DC    F'0'
945+         DC    H'0'
946+         DC    H'5'
947+         DC    H'1'
948+GIP0016  BALR  14,15
949          L     REC,0(R1)                GET ADDR OF DATA
950          LTR   REC,REC                  IS IT EOF
951          BZ    COMPLETE        YES

953 ONWITHIT EQU   *
954          USING RECDSECT,REC             ADDRESSABILITY FOR RECORD

956          TM    RFLAGS,X'80'    WAS THIS RECORD DELETED ?
957          BO    SELLOOP         YES, SKIP IT

959          CLC   RECFORM,FORM             IS THIS THE RIGHT FORM
960          BNE   SELLOOP                  NO, GO GET ANOTHER  RECORD
961 *  WE HAVE A RECORD NOW

963          LA    COMCNT,PROCNT   POINT TO 1ST COUNT IN COMMON
964          LA    PROF,PROTAB              POINT TO 1ST PROFILE ENTRY
965 LOOPPROF C     PROF,LASTVAR    ARE WE TO THE END
966          BH    ALLDONE         YES

968          TM    PROFLG,X'80'    IS THIS ENTRY ACTIVE
969          BZ    PROBUMP         NO,GO TO NEXT ONE

971          LR    R1,REC          ADDR OF RECORD
972          LH    R2,PROIF        DESIRED CODE
973          L     R15,=V(BINARY)
974          BALR  R14,R15         GO LOOK

976          LTR   R2,R2           FOUND ?

978          BZ    VARFALSE        NO

980 CFOUND   CLI   PROOP,X'00'     EXISTANCE
981          BE    VARTRUE         YES
```

TABLE IV(cont)

:CT.PHASE2

```
STMT   SOURCE STATEMENT

 983 *
 984 * LOCATE THE PAREN
 985 *
 986             LH     R9,2(R2)          GET RELATIVE PAREN
 987             CH     R9,ALLF           IS IT NULL
 988             BE     VARFALSE          CODE HAS NO PAREN FOR THIS RECOR
 989             AH     R9,RELPAREN       COMPUTE  ABSOLUTE
 990             LA     R9,RCOUNT(R9)     ADDR OF RECORD,    R9 POINTS TO

 992             LH     R6,0(R9)          GET LENGTH OF PAREN
 993             LA     R6,1(R6)          ADD ON FOR 'END' BLANKS
 994 * R6 CONTAINS REMAINING LENGTH OF PAREN-1
 995             LA     R9,1(R9)          BUMP PAST COUNT TO SAVE1ST LOCAT
 996 * R9 POINTS TO 1ST CHAR
 997             LA     R5,0(R9,R6)       GET ADDR OF LAST 'BLANK LOCATION
 998             ST     R5,LASTLOC        SAVE ADDR OF LAST 'BLANK' IN PAR
 999             ST     R9,FIRSTLOC       SAVE ADDR OF FIRST 'BLANK' IN PA
1000             MVC    SAVELAST,0(R5)     SAVE THE CHARACTER THAT'S HERE
1001             MVC    SAVE1ST,0(R9)      SAVE THE CHAR HERE TOO
1002             MVI    0(R5),C' '        PUT IN A 'LAST BLANK'
1003             MVI    0(R9),C' '        PUT IN A 'FIRST BLANK'
1004             MVI    SAVEBIT,X'80'      SET SAVE SWITCH

1006 ***************************************************************
1007 *
1008 * DETERMINE MODE AND OPERATION, THEN PERFORM IT
1009 *
1010 ***************************************************************
1011             CLI    PROOP,X'08'       WORD MODE ?
1012             BNH    WORDMODE          YES

1014 *
1015 * FIND THE FIRST NUMBER     (ONLY CONSIDERS 1ST NUMBER)
1016 *
1017 LOOKNUM     EX     R6,TRTNUM         SCAN FOR A POSSIBLE NUMBER
1018             BZ     VARFALSE          NONE FOUND

1020             AR     R6,R9             COMPUTE NEW
1021             SR     R6,R1             LENGTH  FOR SCAN
1022             LR     R9,R1

1024             BCTR   R1,0              LOOK AT PRECEEDING CHAR
1025             CLI    0(R1),C' '        IS IT BLANK ?
1026             BE     NUMCHK            MAY BE A NUMBER
1027 NOTNUM      LA     R9,1(R9)          IT WASN'T A NUMBER, SO KEEP LOOK
1028             BCTR   R6,0              DECRE COUNT
1029             B      LOOKNUM           KEEP LOOK'N

1031 NUMCHK      LR     R1,R9             GET DATA ADDR
1032             L      R15,=V(NUMBER)    ADDR OF SUBPROGRAMME
1033             BALR   R14,R15           GO TO IT

1035             B      NOTNUM            NO

1037             MVC    CANNON,0(R1)      MOVE IN THE CANNONICAL NUMBER
```

TABLE IV (cont)

```
CT.PHASE2
STMT    SOURCE STATEMENT
1038              CLI    PROOP,X'0C'     NUMBER EQUAL?
1039              BE     NUMEQU          YES

1041              CLI    PROOP,X'10'     NUMBER GREATER THAN ?
1042              BE     NUMGT           YES

1044              CLI    PROOP,X'14'     NUMBER LESS THAN?
1045              BE     NUMLT           YES

1047 *            CLI    PROOP,X'18'     NUMBER RANGE?
1048 *
1049 * NUMBER RANGE
1050 *
1051 * COULDN'T BE ANYTHING ELSE  RIGHT NOW

1053              CP     CANNON,PROPER1(9)    LOOK AT THE 1ST NUMBER
1054              BL     VARFALSE             ALREADY THROWN OUT

1056              CP     CANNON,PROPER2(9)    LOOK AT THE 2ND THEN
1057              BH     VARFALSE             TOO BAD

1059              B      VARTRUE              IT'S IN THE RANGE (INCLUDIN

1061 *
1062 * NUMBER EQUAL
1063 *
1064 NUMEQU       CP     CANNON,PROPER1(9)    LOOK AT IT
1065              BE     VARTRUE              IT'S EQUAL
1066              B      VARFALSE             OR IT'S NOT

1068 *
1069 * NUMBER GREATER THAN
1070 *
1071 NUMGT        CP     CANNON,PROPER1(9)    LOOK AT IT
1072              BH     VARTRUE              IT'S GREATER
1073              B      VARFALSE             OR IT'S NOT

1075 *
1076 * NUMBER LESS THAN
1077 *
1078 NUMLT        CP     CANNON,PROPER1(9)    LOOK AT IT
1079              BL     VARTRUE              IT'S LESS
1080              B      VARFALSE             OR IT'S NOT


1082 WORDMODE     MVI    SCNTABL,X'00'   ZERO OUT THE
1083              MVC    SCNTABL+1(255),SCNTABL  TRT TABLE
1084              SR     R5,R5           ZERO OUT
1085              IC     R5,PROPER1      GET 1ST CHAR OF SEARCH PAREN
1086              CLI    PROOP,X'04'     IS IT WORD EQU OR RANGE
1087              BNE    WORDRANG        RANGE
1088              STC    R5,SCNTABL(R5)  STORE IT IN THE TABLE AT PROPER
1089              B      SRCHLNG         GO LOOK'N
```

TABLE IV (cont)

CT.PHASE2

```
STMT   SOURCE STATEMENT

1092 WORDRANG SR    R8,R8              ZERO OUT
1093          IC    R8,PROPER2         GET 1ST CHAR OF SECOND PAREN
1094          SR    R8,R5              COMPUTE LENGTH MINUS 1
1095          LA    R5,SCNTABL(R5)     GET ADDR OF WHERE 1ST CHAR GOES
1096          MVI   0(R5),X'77'        PUT IN A NON-ZERO
1097          LTR   R8,R8              WHAT DO WE HAVE IN THIS REG
1098          BZ    SRCHLNG            A ZERO  ( SAME CHARACTER )
1099          BCTR  R8,0               DECRE LENGTH FOR EXECUTE
1100          EX    R8,TABLFIX         BUILD THE TABLE

1102 SRCHLNG  SR    R5,R5              GET A ZERO
1103          IC    R5,PROLNG          GET LENGTH OF SEARCH PAREN
1104          BCTR  R5,0               ADJUST FOR EXECUTE

1106 WORDSCAN CH    R6,CON255          IS IT LONGER THAN 256 CHAR ?
1107          BL    SCANEND            NO
1108          TRT   0(256,R9),SCNTABL SCAN FOR 1ST LETTER OF WORD
1109          BNZ   HITWORD            THIS MAY BE IT
1110          LA    R9,256(R9)         BUMP LOCATION
1111          SH    R6,CON256          DECRE COUNT
1112          B     WORDSCAN           KEEP UP THE SEARCH

1114 SCANEND  LTR   R6,R6              WHAT'S THE SIGN
1115          BM    VARFALSE           NOT FOUND
1116          EX    R6,WORDTRT         EXECUTE FINAL SCAN
1117          BZ    VARFALSE           NOTHING

1119 HITWORD  AR    R6,R9              COMPUTE NEW
1120          SR    R6,R1              LENGTH FOR SCAN
1121          LR    R9,R1              BUMP SCAN LOC

1123          CLI   PROOP,X'04'        IS IT WORD EQU  OR RANGE
1124          BNE   WRDRANGE           RANGE

1126 *
1127 * WORD EQUAL
1128 *
1129          EX    R5,COMP1           IS THIS THE WORD
1130          BE    VARTRUE            WE FOUND IT,  BIG DEAL ...

1132 BUMPWORD LA    R9,1(R9)           BUMP PAST, THIS ISN'T  IT
1133          BCTR  R6,0               DECRE THE LENGTH
1134          B     WORDSCAN           KEEP LOOK'N
```

TABLE IV (cont)

CT.PHASE2

```
STMT   SOURCE STATEMENT

1136 *
1137 * WORD RANGE
1138 *
1139 WRDRANGE EX     R5,COMP1          IS IT IN THE RANGE
1140          BH     BUMPWORD          C'EST LA VIE
1141          EX     R5,COMP2          ONE MORE CHECK
1142          BL     BUMPWORD          NOT IT

1144          B      VARTRUE           WE'VE GOT IT
```

TABLE IV(cont)

CI.PHASE2

```
STMT    SOURCE STATEMENT

1146 *
1147 *
1148 VARTRUE   MVI    PROTRUE,X'01'    SET 01 FOR TRUE  IN PROFILE
1149           L      R5,0(COMCNT)     GET COUNT IN COMMON
1150           LA     R5,1(R5)         ADD ONE
1151           ST     R5,0(COMCNT)     PUT BACK
1152           B      CHKSAVE          GO AROUND

1154 VARFALSE MVI    PROTRUE,X'00'    SET 00 FOR FALSE IN PROFILE

1156 CHKSAVE   CLI    SAVEBIT,X'80'    DID WE SAVE THE CHARACTERS ?
1157           BNE     PROBUMP         NO

1159           L      R5,LASTLOC       GET SAVED LOC OF LAST OF PAREN
1160           MVC    0(1,R5),SAVELAST PLUG WHAT WAS IN HERE, BACK IN
1161           L      R5,FIRSTLOC      GET SAVED LOC OF FIRST OF PAREN
1162           MVC    0(1,R5),SAVE1ST   PLUG WHAT WAS IN HERE, BACK I
1163           MVI    SAVEBIT,X'00'    RESET SWITCH

1165 PROBUMP   LA     PROF,64(PROF)    BUMP TO NEXT PROFILE ENTRY
1166           LA     COMCNT,4(COMCNT) BUMP TO NEXT COUNT IN COMMON
1167           B      LOOPPROF         GO TO PROCESS THE NEXT
1168 ALLDONE   EQU    *
1169           CLI    LOGBYTE,X'80'    EVALUATE
1170           BE     LOGIC           GO EVALUATE IT

1172 *         EVAL   WEIGHT   GOES   HERE
1173 *   BOTH  RETURN TO HERE, REG 1  HAS EITHER  0 OR 1
1174 *

1176 EVALRTN   L      R5,PROTOTAL      GET TOTAL COUNT
1177           LA     R5,1(R5)         ADD 1
1178           ST     R5,PROTOTAL      PUT IT BACK

1180           CLI    ISWITCH,X'80'     ITERATE?
1181           BNE    NONIT            NOPE

1183           LTR    R1,R1            WAS IT SELECTED?
1184           BNZ    BUMPSEL          COUNT IT

1186           L      REC,SAVSRF       THIS IS THE ADDR OF SRF REC
1187           USING  RECDSECT,REC
1188           OI     RFLAGS,X'80'     FLAG THIS AS NOT AVAILABLE FOR N
1189           ST     REC,PSRF         DATA ADDR TO PUT THIS TO REWRITE
1190           GETPUT FILE=6,PROC=6,PARM=PSRF  PUT THIS SRF REC
1191+*                                GIPSY CALL TO COMIO
1192+          L      15,ACOMIO
1193+          LA     1,GIPLO017
1194+          B      GIP0017
1195+GIPLO017  DS     OF
1196+PSRF      DC     A(0)
1197+          DC     F'0'
1198+          DC     H'0'
1199+          DC     H'6'
```

TABLE IV (cont)

```
CT.PHASE2

STMT   SOURCE STATEMENT

1201+GIPO017  BALR   14,15
1202          B      ITSEAR             GO ON WITH ITERATION

1204 NONIT    LTR    R1,R1              WHAT WAS RESULT?
1205          BZ     SELLOOP            NOT SELECTED, GO TO NEXT RECORD

1207          LA     R5,RECPARMS+4      GET ADDR OF  LOCATION
1208          L      R6,0(R5)           GET TTRZ
1209          ST     R6,SRFRADR         PUT IN SRF RECORD
1210          LH     R6,4(R5)           GET RR
1211          STH    R6,SRFRADR+4       PUT IN SRF RECORD
1212          MVI    SRFREC+3,X'01'     DEFINE SUBSET 1
1213          GETPUT FILE=6,PROC=2,DATA=SRFREC     PUT NEXT TO SRF
1214+*                                GIPSY CALL TO COMIO
1215+         L      15,ACOMIO
1216+         LA     1,GIPL0018
1217+         B      GIP0018
1218+GIPL0018 DS     0F
1219+         DC     A(SRFREC)
1220+         DC     F'0'
1221+         DC     H'0'
1222+         DC     H'6'
1223+         DC     H'2'
1224+GIP0018  BALR   14,15

1226 BUMPSEL  L      R5,PROSELCT        GET SELECTED COUNT
1227          LA     R5,1(R5)           ADD 1
1228          ST     R5,PROSELCT        PUT IT BACK

1230          CP     SUBSET,=P'1'             IS THIS THE FIRST SUBSET
1231          BE     SELLOOP
1232          L      REC,SAVSRF  THIS IS SRF ADDR
1233          USING  RECDSECT,REC
1234          MVC    RFLAGS+1(1),CHARSUB
1235 PUTTHIS  EQU    *
1236          GETPUT FILE=6,PROC=6,PARM=CHPTHIS  *DEFINE THIS SUBSE
1237+*                                GIPSY CALL TO COMIO
1238+         L      15,ACOMIO
1239+         LA     1,GIPL0019
1240+         B      GIP0019
1241+GIPL0019 DS     0F
1242+CHPTHIS  DC     A(0)
1243+         DC     F'0'
1244+         DC     H'0'
1245+         DC     H'6'
1246+         DC     H'6'
1247+GIP0019  BALR   14,15
1248          B      SELLOOP            GO TO NEXT RECORD
```

TABLE IV (cont).

CT.PHASE2

```
STMT   SOURCE STATEMENT

1250 ****************************************************************
1251 *
1252 *  PURPOSE - DISPLAY THE COUNTS OF RECORDS REVIEWED AND SELECT
1253 *            DISPLAY COUNTS OF INDIVIDUAL VARIABLES SATISFIED.
1254 *            COMMAND IS USED IN LIEU OF PRINT IN ORDER TO DECR
1255 *            THE SIZE OF THE SELECTED SUBSET WITHOUT PRINTING
1256 *            INITIAL SUBSETS.
1257 *
1258 *  SPECIFICATIONS - PROFILE IS IN COMMON SO MAY BE ACCESSED BY
1259 *
1260 ****************************************************************

1262 COMPLETE EQU   *
1263          GETPUT FILE=1,PROC=2,DATA=DUMLINE      SKIP A LINE
1264+*                                   GIPSY CALL TO COMIO
1265+          L      15,ACOMIO
1266+          LA     1,GIPL0020
1267+          B      GIP0020
1268+GIPL0020 DS     0F
1269+          DC     A(DUMLINE)
1270+          DC     F'0'
1271+          DC     H'0'
1272+          DC     H'1'
1273+          DC     H'2'
1274+GIP0020  BALR   14,15
1275          L      R5,PROTOTAL       CONVERSION
1276          CVD    R5,UNLOAD         DEC
1277          MVC    NUMSEAR,EDIT
1278          ED     NUMSEAR(8),UNLOAD+4
1279          GETPUT FILE=1,PROC=2,DATA=SEARCHED
1280+*                                   GIPSY CALL TO COMIO
1281+          L      15,ACOMIO
1282+          LA     1,GIPL0021
1283+          B      GIP0021
1284+GIPL0021 DS     0F
1285+          DC     A(SEARCHED)
1286+          DC     F'0'
1287+          DC     H'0'
1288+          DC     H'1'
1289+          DC     H'2'
1290+GIP0021  BALR   14,15

1292          L      R5,PROSELCT       CONV
1293          CVD    R5,UNLOAD         DEC
1294          MVC    NUMSEL,EDIT
1295          ED     NUMSEL(8),UNLOAD+4
1296          MVC    SUBSETNO,EDITCH
1297          ED     SUBSETNO,SUBSET+6         GET 3 POSITIONS

1299          GETPUT FILE=1,PROC=2,DATA=SELECTED
1300+*                                   GIPSY CALL TO COMIO
1301+          L      15,ACOMIO
1302+          LA     1,GIPL0022
1303+          B      GIP0022
1304+GIPL0022 DS     0F
```

TABLE IV (cont)

CT.PHASE2

```
STMT    SOURCE STATEMENT

1305+           DC     A(SELECTED)
1306+           DC     F'0'
1307+           DC     H'0'
1308+           DC     H'1'
1309+           DC     H'2'
1310+GIP0022    BALR   14,15

1312            GETPUT FILE=1,PROC=2,DATA=BREAKDWN
1313+*                                 GIPSY CALL TO COMIO
1314+           L      15,ACOMIO
1315+           LA     1,GIPL0023
1316+           B      GIP0023
1317+GIPL0023   DS     0F
1318+           DC     A(BREAKDWN)
1319+           DC     F'0'
1320+           DC     H'0'
1321+           DC     H'1'
1322+           DC     H'2'
1323+GIP0023    BALR   14,15
```

TABLE IV (cont)

CT.PHASE2

```
STMT    SOURCE STATEMENT

1325              SR    R9,R9            ZERO WORD DISPLACEMENT
1326              SR    R6,R6             ZERO ALFA COUNTER

1328 VARLOOP      L     R8,PROCNT(R9)    LOAD PROFILE COUNT
1329              CL    R8,FFFF          IS IT UNTOUCHED BY COMPUTER HAND
1330              BE    BUMPER           YES

1332              CVD   R8,UNLOAD        DEC
1333              MVC   NUMSTAT,EDIT
1334              ED    NUMSTAT(8),UNLOAD+4
1335              LA    R2,ALFALIST(R6)   CHAR DISPLACEMENT
1336              MVC   VARIABLE,0(R2)   CHAR FOR VARIABLE

1338              GETPUT FILE=1,PROC=2,DATA=PLINE
1339+*                                  GIPSY CALL TO COMIO
1340+             L     15,ACOMIO
1341+             LA    1,GIPL0024
1342+             B     GIP0024
1343+GIPL0024     DS    0F
1344+             DC    A(PLINE)
1345+             DC    F'0'
1346+             DC    H'0'
1347+             DC    H'1'
1348+             DC    H'2'
1349+GIP0024      BALR  14,15

1351 BUMPER       LA    R6,1(R6)         BUMP VARIABLE LIST
1352              LA    R9,4(R9)         BUMP WORD
1353              CH    R6,=H'26'        END?
1354              BNE   VARLOOP          NO

1356              GETPUT FILE=1,PROC=2,DATA=DUMLINE
1357+*                                  GIPSY CALL TO COMIO
1358+             L     15,ACOMIO
1359+             LA    1,GIPL0025
1360+             B     GIP0025
1361+GIPL0025     DS    0F
1362+             DC    A(DUMLINE)
1363+             DC    F'0'
1364+             DC    H'0'
1365+             DC    H'1'
1366+             DC    H'2'
1367+GIP0025      BALR  14,15

1369 IMSGLOOP GETPUT FILE=1,PROC=2,DATA=IMSG ITERATION MSG
1370+*                                  GIPSY CALL TO COMIO
1371+IMSGLOOP     L     15,ACOMIO
1372+             LA    1,GIPL0026
1373+             B     GIP0026
1374+GIPL0026     DS    0F
1375+             DC    A(IMSG)
1376+             DC    F'0'
1377+             DC    H'0'
1378+             DC    H'1'
1379+             DC    H'2'
```

TABLE IV(cont)

CT.PHASE2

```
STMT    SOURCE STATEMENT

1380+GIP0026  BALR   14,15

1382 GETREP   EQU    *
1383          GETPUT FILE=0,PROC=1 WHAT IS THE REPLY FROM TERMINAL?
1384+*                            GIPSY CALL TO COMIO
1385+         L      15,ACOMIO
1386+         LA     1,GIPL0027
1387+         B      GIP0027
1388+GIPL0027 DS     0F
1389+         DC     A(0)
1390+         DC     F'0'
1391+         DC     H'0'
1392+         DC     H'0'
1393+         DC     H'1'
1394+GIP0027  BALR   14,15
1395          L      REC,0(R1)        THE DATA ADDR
1396          TRT    0(40,REC),VARTAB  LOOK FOR ANSWER
1397          BZ     REPYN           GIVE ANOTHER TRY

1399          CLI    0(R1),C'Y'       ITERATE?
1400          BNE    CCOMP            NOPE
1401          TRT    0(40,REC),SSETTAB  SCAN FOR NEW(PREV)SUBSET NO.
1402          BNZ    CHGSUBST           CHANGE SS NO. AND GO TO'ITER
1403 INCSUB   AP     SUBSET,=P'1'       INCRE SUBSET NO.
1404 *
1405          CVB    R2,SUBSET            GET BINARY SUBSET NO
1406          STC    R2,CHARSUB           STORE 1-BYTE TO PLACE IN R
1407 ****(AFTER INCSUB)                   USE FOR SUBSET INDICATOR

1409 ITER     EQU    *
1410          MVI    ISWITCH,X'80'    SET ITERATION SWITCH
1411          LA     PROF,PROTAB      ADDR OF PROFILE
1412          LA     R2,PROND         GET STOP ADDR
1413 INLOOP   NI     PROFLG,X'00'     ZERO LIKE UNUSED VARIABLE
1414          LA     PROF,64(PROF)      BUMP PROFILE ENTRY
1415          CR     PROF,R2          ARE WE TO THE END ?
1416          BNH    INLOOP     NO ZERO SUM MORE

1418          B      INIT             GO ITERATE SOME

1420 CCOMP    CLI    0(R1),C'N'       CONTINUE?
1421          BNE    REPYN              NEITHER GIVE ANOTHER TRY

1423          KEEP
1424+         L      13,SVA+4
1425+         LM     14,12,12(13) * HOUSEKEEPING *
1426+         BR     14
1427+SVA      DS     9D

1429 REPYN    GETPUT FILE=1,PROC=2,DATA=YESNO  ASK FOR PROPER RESPO
1430+*                            GIPSY CALL TO COMIO
1431+REPYN    L      15,ACOMIO
1432+         LA     1,GIPL0029
1433+         B      GIP0029
```

TABLE IV (cont)

CT.PHASE2

```
STMT    SOURCE STATEMENT

1435+            DC     A(YESNO)
1436+            DC     F'0'
1437+            DC     H'0'
1438+            DC     H'1'
1439+            DC     H'2'
1440+GIP0029     BALR   14,15
1441             B      GETREP

1443 CHGSUBST    EQU    *
1444             TRT    1(1,R1),SSETTAB      CHECK NEXT POS FOR NUMERIC
1445             BNZ    TWODIGIT             NUMBER OF FORM XX
1446             PACK   CHKSUBNO,0(1,R1)     NUMBER OF FORM X -PACK DESIR
1447             B      BACKCK
1448 TWODIGIT    PACK   CHKSUBNO,0(2,R1)                    XX-PACK DESIR
1449 BACKCK      CP     CHKSUBNO,SUBSET
1450             BH     INVALSUB             CANNOT GO TO HIGHER SUBSET N
1451             B      CANDO
1452 INVALSUB GETPUT FILE=1,PROC=2,DATA=BADSUB
1453+*                                 GIPSY CALL TO COMIO
1454+INVALSUB    L      15,ACOMIO
1455+            LA     1,GIPL0030
1456+            B      GIP0030
1457+GIPL0030    DS     0F
1458+            DC     A(BADSUB)
1459+            DC     F'0'
1460+            DC     H'0'
1461+            DC     H'1'
1462+            DC     H'2'
1463+GIP0030     BALR   14,15
1464             B      IMSGLOOP             TRY REPLY AGAIN
1465 CANDO       MVC    SUBSET,CHKSUBNO      MOVE PREV SS# TO SUBSET INDI
1466             CVB    R1,CHKSUBNO          CONVERT PREVIOUS SUBSET AND
1467             STC    R1,CHAR              STORE CHARACTER TO COMPARE C
1468 *                                       TO RFLAGS+1(1)
1469             GETPUT FILE=6,PROC=3   GETFIRST  TO SRF
1470+*                                 GIPSY CALL TO COMIO
1471+            L      15,ACOMIO
1472+            LA     1,GIPL0031
1473+            B      GIP0031
1474+GIPL0031    DS     0F
1475+            DC     A(0)
1476+            DC     F'0'
1477+            DC     H'0'
1478+            DC     H'6'
1479+            DC     H'3'
1480+GIP0031     BALR   14,15
1481 CHNO        GETPUT FILE=6,PROC=1,PARM=CHGSRF     GN TO SRF
1482+*                                 GIPSY CALL TO COMIO
1483+CHNO        L      15,ACOMIO
1484+            LA     1,GIPL0032
1485+            B      GIP0032
1486+GIPL0032    DS     0F
1487+CHGSRF      DC     A(0)
1488+            DC     F'0'
1489+            DC     H'0'
```

TABLE IV (cont)

```
CT.PHASE2

STMT    SOURCE STATEMENT

1490+          DC     H'6'
1491+          DC     H'1'
1492+GIP0032   BALR   14,15
1493           L      REC,0(R1)         TEST FOR EOF
1494           LTR    REC,REC
1495           BZ     INCSUB                EOF ON SRF
1496           CLC    RFLAGS+1(1),CHAR      IF COMPARE >= KEEP,OTHERS
1497           BL     CHNO                  LEAVE IN FLAGGED STATE
1498           ST     REC,CHPARM
1499           MVI    RFLAGS,X'00'          FLAG AS ACTIVE NOW
1500           MVC    RFLAGS+1(1),CHAR      PUT DESIRED SS# IN ALL ACT
1501           MVC    CHPARM+4(6),CHGSRF+4
1502 *                                      ENTRIES
1503           GETPUT FILE=6,PROC=6,PARM=CHPARM  PUTTHIS TO SRF
1504+*                               GIPSY CALL TO COMIO
1505+          L      15,ACOMIO
1506+          LA     1,GIPL0033
1507+          B      GIP0033
1508+GIPL0033  DS     0F
1509+CHPARM    DC     A(0)
1510+          DC     F'0'
1511+          DC     H'0'
1512+          DC     H'6'
1513+          DC     H'6'
1514+GIP0033   BALR   14,15
1515           B      CHNO
1516 ************************ LOGICAL END OF SELECT *************
```

TABLE V

```
;1.PHASE1.LOGSYN

STMT   SOURCE STATEMENT

361 ****************************************************************
362 *
363 *  LOGSYN - ROUTINE
364 *
365 *  PURPOSE - CHECKS THE LOGICAL STATEMENT FOR SYNTACTICAL ERRO
366 *
367 *  SPECIFICATIONS - CONVERT BOOLEAN OPERATORS AND, OR, NOT TO
368 *                   SYMBOLS *, +, ¬ . SCAN OUT BLANKS AND CHEC
369 *                   FOR UNBALANCED PARENTHESIS. STEP THRU A
370 *                   TRANSITION TABLE FOR SYNTAX CHECK.
371 *                   USES R7,R8,R9,R14,R15
372 *  NOTE - THE LOGIC CARD IMAGE IS LEFT IN THE CARD BUFFER (ADD
373 *         ACARD ). IF ANY MORE PARMS ARE TO BE READ IN, IT MUS
374 *         BE MOVED OUT.
375 *
376 ****************************************************************

378            MVI   LOGBYTE,X'80'   SET TYPE AS LOGIC
379            LA    R7,1            INITIALIZE PARENTHESIS BALANCER
380            LA    R9,5(R9)        BUMP PAST LOGIC
381            L     R8,ACARD        START 'TO' POSITION
382            BAL   R14,XLAT        SCAN NON BLANK

384            B     BDCRD           BLANK LOGIC CARD     -END-
385            B     BALAN           MOVE AND BUMP        -OTHER-
386            B     INITENT         CHECK FOR OPERATORS  -ALFA

388 NONBLANK   BAL   R14,XLAT        NON BLANK SCAN

390            B     SETBLANK        FLAG END
391            B     BALAN           MOVE ONE AND BUMP ONE
392 INITENT   *CLC   0(3,R9),=C'AND' AND OPERATOR?
393            BNE   NOTCHECK        NO

395            MVI   0(R8),C'*'      * OPERATOR
396 BUMP3      LA    R9,3(R9)        BUMP 'FROM' BY 3
397            B     BUMPTO          BUMP 'TO' BY 1
```

TABLE V (cont)

CT.PHASE1.LOGSYN

```
STMT   SOURCE STATEMENT

399 NOTCHECK CLC   0(3,R9),=C'NOT' NOT OPERATOR?
400          BNE   ORCHECK         NO

402          MVI   0(R8),C'¬'      ¬ OPERATOR
403          B     BUMP3           BUMP 'FROM' BY 3, AND 'TO' BY 1

405 ORCHECK  CLC   0(2,R9),=C'OR'  OR OPERATOR?
406          BE    FIXOR           YES

408          SR    R2,R2           ZERO OUT HIGH BITS
409          TRT   0(1,R9),VARTAB  GET THE DISPLACEMENT FUNCTION
410          BCTR  R2,0            REDUCE BY 1
411          SLL   R2,6            PROFILE DISPLACEMENT
412          LA    PROF,PROTAB(R2) ABSOLUTE
413          USING PROD,PROF       ADDRESSABILITY FOR PROFILE

415          CLI   PROFLG,X'80'    IS THIS ENTRY ACTIVE ?
416          BNE   PNOTACT
417          B     MOVEONE         IT'S OK

419 PNOTACT  MVC   MSGLINE,NOTACTM NOT ACTIVE MESSAGE
420          BAL   R6,MSGPRT
421          B     GETPARM         GET ANOTHER LOGIC STATEMENT

423 FIXOR    MVI   0(R8),C'+'      + OPERATOR
424          LA    R9,2(R9)        BUMP 'FROM' BY 2
425          B     BUMPTO          BUMP 'TO' BY 1

427 BALAN    CLI   0(R9),C'('      LT PARENTHESIS?
428          BNE   RTPSES          NO
429          LA    R7,1(R7)        BUMP PARENTHESIS BALANCER
430          B     MOVEONE         MOVE THE BLIGHTER

432 RTPSES   CLI   0(R9),C')'      RT PARENTHESIS?
433          BNE   MOVEONE         MOVE THE BLIGHTER

435          BCT   R7,MOVEONE      DECREMENT

437 UNBALANC MVC   MSGLINE,UNBAL     UNBALANCED PARENTHESIS
438 TROUBLE  BAL   R6,MSGPRT
439          B     GETPARM         TRY LOGIC AGAIN

441 MOVEONE  MVC   0(1,R8),0(R9)   MOVE A CHARACTER
442          LA    R9,1(R9)        BUMP 'FROM' BY 1
443 BUMPTO   LA    R8,1(R8)        BUMP 'TO' BY 1
444          B     NONBLANK        SCAN SUM MORE

446 SETBLANK MVI   0(R8),X'FE'     LOGIC EVALUATOR STOPPER
447          BCT   R7,UNBALANC     BALANCED PARENTHESIS?
```

TABLE V (cont)

CT.PHASE1.LOGSYN

```
STMT   SOURCE STATEMENT

449 *                    BEGIN TRANSITION CHECKING - BEGIN IN STATE 1

451 TRANSIT   L      R9,ACARD          ADDR OF LOGIC
452 STATE1    BAL    R14,XLAT          SCAN LOGIC

454           B      BETA              HIT TERMINATOR
455           B      NONCHAR           STATE1
456 STATE2    LA     R9,1(R9)          A VARIABLE, BUMP PAST
457           CLI    0(R9),C'+'        OR?
458           BE     STATBUMP          YES

460           CLI    0(R9),C'*'        AND?
461           BE     STATBUMP          YES

463           CLI    0(R9),C')'        LT PARENTHESIS?
464           BNE    BETA
465           B      STATE2            GO TO STATE2

467 NONCHAR   CLI    0(R9),C'('        LT PARENTHESIS?
468           BE     STATBUMP          NO

470           CLI    0(R9),C'¬'        NOT?
471           BNE    INVALID

473           LR     R7,R9             TEMP STORE
474           BCTR   R7,0              DECREMENT
475           CLI    0(R7),C'¬'        PREVIOUS NOT ?  THIS IS ALFA TES
476           BNE    STATBUMP

478 INVALID   MVC    MSGLINE,INVLOG     INVALID LOGIC EXPRESSION

480           B      TROUBLE
```

TABLE V (cont)

CT.PHASE1.LOGSYN

```
STMT    SOURCE STATEMENT

 482 STATBUMP LA     R9,1(R9)         BUMP
 483          B      STATE1           GO TO STATE 1

 485 BETA     CLI    0(R9),X'FE'      END OF LOGIC?
 486          BNE    INVALID          NO, BOMBED

 488          MVI    0(R9),C' '       REPLACE WITH BLANK

 490          BCTR   R9,0             DECREMENT
 491          CLI    0(R9),C')'       PREVIOUS LT PARENTHESIS
 492          BE     CHKVAR           OK

 494          TRT    0(1,R9),VARTAB   PREVIOUS ALFA?
 495          BZ     INVALID          NO
 496          B      CHKVAR           END OF LOGSYN
```

TABLE VI

```
C1.PHASE2.LOGIC

STMT   SOURCE STATEMENT

1518 ******************************************************************
1519 *
1520 *  LOGIC - SUBPROGRAMME
1521 *
1522 *  PURPOSE - AFTER RUNNING THE PROFILE AGAINST A RECORD,
1523 *            THIS WILL PERFORM BOOLEAN OPERATIONS ON THE
1524 *            TRUTH VALUES OF THE RESPECTIVE VARIABLES.
1525 *
1526 *  SPECIFICATIONS-
1527 *
1528 *           1)  SCAN FOR ¬V, COMPLEMENT C, SHIFT LEFT 1
1529 *
1530 *           2)  SCAN FOR V@V, REPLACE BY X, SHIFT LEFT 2
1531 *
1532 *           3)  SCAN FOR (V), REPLACE BY V, SHIFT LEFT 2
1533 *
1534 *           4)  PREVIOUS REDUCTION IN LOOP?
1535 *
1536 *               YES - START OVER AT 1)
1537 *               NO  - FINISHED
1538 *
1539 *           TRUTH VALUE GRAVITATES TO POSITION 1 IN WORK AREA
1540 *           THEN RETURNED IN REGISTER 1.
1541 *
1542 ******************************************************************

1544 LOGIC    LA    R6,LOGSAVE        ADDR OF LOGIC SAVE AREA
1545          L     R8,ACARD          ADDR OF LOGIC
1546          MVC   0(72,R6),0(R8)    MOVE IT
1547          MVI   VARTAB+64,C' '    INSERT BLANK IN VARIABLE TABLE

1549 ALFALOOP SR    R2,R2             ZERO OUT HIGH BITS
1550          TRT   0(72,R6),VARTAB   SCAN FOR ALFA
1551          CLI   0(R1),C' '        END OF LOGIC STATEMENT ?
1552          BE    EVALUATE          YES

1554          BCTR  R2,0              REDUCE BY 1
1555          SLL   R2,6              PROFILE DISPLACEMENT
1556          LA    PROF,PROTAB(R2)   ABSOLUTE
1557          USING PROD,PROF         ADDRESSABILITY FOR PROFILE

1559          MVC   0(1,R1),PROTRUE   TRUTH VALUE INTO LOGIC STATEMEN
1560          LA    R6,1(R1)          BUMP SCAN POSITION
1561          B     ALFALOOP

1563 EVALUATE MVI   VARTAB+64,X'00'   RESTORE VARIABLE TABLE

1565 PHASE1   MVI   REDUCE,X'00'      RESET REDUCTION TEST
1566          LA    R6,LOGSAVE
1567 INTER1   TRT   0(72,R6),NOTAB    SCAN FOR ¬ OR BLANK
1568          CLI   0(R1),C'¬'        NOT ?
1569          BNE   PHASE2            NO

1571          MVI   REDUCE,X'80'      SET REDUCE
1572          CLI   1(R1),C'('        IS IT ¬V ?
```

TABLE VI (cont)

CT.PHASE2.LOGIC

```
STMT    SOURCE STATEMENT

1573              BE      NOTBUMP            NO

1575              XI      1(R1),X'01'        COMPLEMENT
1576              MVC     0(72,R1),1(R1)     SHIFT LEFT 1
1577 NOTBUMP      LA      R6,2(R1)           BUMP
1578              B       INTER1

1580 PHASE2       LA      R6,LOGSAVE
1581 INTER2       TRT     0(72,R6),OPTAB     SCAN FOR CONNECTIVE OR BLANK
1582              CLI     0(R1),C' '         BLANK ?
1583              BE      PHASE3             YES

1585              MVI     REDUCE,X'80'       SET RED
1586              BCTR    R1,0               LOOK BACK
1587              CLI     0(R1),C')'         WAS CONNECTING TERM?
1588              BE      RESBUMP2           YES

1590              CLI     2(R1),C'('         CONNECTING TERM?
1591              BNE     VARCONEC           YES

1593 RESBUMP2     LA      R6,3(R1)           RESTORE POSITION
1594              B       INTER2             HUNT SOME MORE

1596 VARCONEC     CLI     2(R1),C'¬'         IS IT A NOT?
1597              BE      RESBUMP2           YES, THERE'S NOTHING TO DO

1599              CLI     1(R1),C'*'         AND?
1600              BNE     LOGOR              NO,MUST BE OR CONNECTIVE

1602              NC      2(1,R1),0(R1)      LOGICAL PRODUCT
1603 SHIFT2       MVC     0(72,R1),2(R1)     SHIFT LEFT 2
1604              LA      R6,1(R1)           BUMP SCAN POSITION
1605              B       INTER2

1607 LOGOR        OC      2(1,R1),0(R1)      LOGICAL SUM
1608              B       SHIFT2             GO ON

1610 PHASE3       LA      R6,LOGSAVE         ADDR OF LOGIC
1611 INTER3       TRT     0(72,R6),LPTSTAB   SCAN FOR LEFT PAREN OR BLANK
1612              CLI     0(R1),C' '         BLANK ?
1613              BE      PHASE4

1615              MVI     REDUCE,X'80'       SET REDUCTION
1616              CLI     2(R1),C')'         (V)  ?
1617              BNE     PHS4BUMP           NO

1619              MVC     0(1,R1),1(R1)      MOVE VAR DOWN
1620              MVC     1(72,R1),3(R1)     MOVE REST DOWN
1621 PHS4BUMP     LA      R6,1(R1)           BUMP SCAN POSITION
1622              B       INTER3             GO ON

1624 PHASE4       CLI     REDUCE,X'80'       PREVIOUS REDUCTION IN LOOP?
1625              BE      PHASE1             YES

1627              SR      R1,R1              ZERO OUT HIGH ORDER BITS
```

TABLE VI (cont)

CT.PHASE2.LOGIC

| STMT | SOURCE STATEMENT | | |
|---|---|---|---|
| 1628 | JC | R1,LOGSAVE | GET TRUTH VALUE |
| 1629 | B | EVALRTN | RETURN |

Having described the invention in connection with certain specific embodiments thereof, it is to be understood that further modifications may now suggest themselves to those skilled in the art and it is intended to cover such modifications as fall within the scope of the appended claims.

What is claimed is:

1. A method of information retrieval by computer having a direct access memory to answer any query that can be satisfied from data as it appears in natural form which comprises:

a. storing in a first section of said memory as a record file the successive strings of variable content natural language textual data to be retrieved,
b. storing in a second section of said memory as a dictionary file a set of label word codes, one for each predetermined identifiable variable portion of said data,
c. immediately accessing any existing identifiable portion of each string which satisfies any search criteria presented to said computer in terms which include at least one said word label, and
d. registering the results thereof.

2. The method of claim 1 wherein said search criteria includes a plurality of said labels and a logic statement of at least one of and, or and not.

3. A method of information retrieval by computer having a direct access memory to answer any query that can be satisfied from data as it appears in natural form which comprises:

a. storing in a first section of said memory as a record file the successive strings of variable content natural language textual data to be retrieved and a set of internal format codes for each string to permit location in each said string of predetermined identifiable variable portions,
b. storing in a second section of said memory a dictionary file of mnemonic label words and an internal format code for each said identifiable variable portion,
c. in response to designating a label in said dictionary file, immediately accessing any existing identifiable portion of each string which satisfies search criteria represented at least in part by said label, and
d. storing in a third section of said memory a selected record file of the address of each record in said record file which satisfies said search criteria.

4. The method set forth in claim 2 wherein:

a. the results of the said retrieval are indicated,
b. a second label word internal format code is accessed from said second location, and
c. said second label word internal format code is utilized to access any existing identifiable portion of those strings whose addresses are stored in said selected record file.

5. The method of claim 4 wherein said search criteria includes a plurality of said labels and a logic statement of at least one of and, or, and not.

6. A method of information retrieval by computer having a direct access memory to answer any query that can be satisfied from data as it appears in natural form which comprises:

a. storing in a first section of said memory as a record file the successive strings of variable content natural language textual information to be retrieved with each string accompanied by a set of internal format codes for each member of said set to permit location in each said string of predetermined identifiable variable portions of each string,
b. storing in a second section of said memory a dictionary file of mnemonic label words and an internal format code for each said identifiable variable portion,
c. accessing a query label word internal format code from said second location,
d. utilizing said internal format code for accessing any existing identifiable portion of each string which satisfies search criteria represented at least in part by said query label word, and
e. storing in a third section of said memory a selected record file of the address of each record in said record file which satisfies the search criteria.

7. A method of information retrieval by computer where a direct access memory is provided which comprises:

a. storing in a first section of said memory as a record file the successive strings of variable content natural language textual information to be retrieved with each string accompanied by a set of internal format codes for each member of said set to permit location in each said string of predetermined identifiable variable portions of each string,
b. storing in a second section of said memory a dictionary file of mnemonic label words and an internal format code for each said identifiable variable portion,
c. manually initiating immediate access to identifiable portions of said record file by entering an interrogation of said record file by way of said dictionary file,
d. indicating the results of said search,
e. manually entering a second interrogation of the portion of said record file satisfying said first interrogation by way of said dictionary file, and
f. indicating the results of said second interrogation.

8. In automatic data processing where a direct access memory stores records in the form of alphanumeric data at addressable memory locations, the method which comprises:

a. responsive to an input search profile, storing in said memory an internal format code representative of classes of portions of said data to be searched along with a search argument for each said code,
b. responsive to said code and argument, serially comparing each said argument with the portion of said stored data designated by said code,
c. in response to said comparison, storing in said memory the address of each record having a record portion which corresponds with each of said variable signals,
d. responsive to a second input search profile, storing in said memory a new internal format code representative of additional classes of portions of said data to be searched along with new search argument for each said code,
e. responsive to said new internal format code and argument, serially comparing said new search arguments with the portions of said data stored at the stored addresses, and
f. registering an indicia representative of the addresses satisfying said new internal format code and its arguments.

9. The method of retrieval of information from a multirecord data base stored in direct access memory of an automatic data processing machine which comprises:

a. storing a code representative of a search profile in a designated portion of the memory of said machine, the search profile comprising
   i. a label for designating the portion of each record to be searched,
   ii. an operation symbol, and
   iii. a search argument, and one logic code interrelating the search arguments of all said labels and symbols,
b. accessing the portions of each of said records designated by said label for existence or nonexistence of the search argument,
c. generating truth values in response to comparison of the results of said search based upon said logic code, and
d. storing in memory the address of each record which satisfies said search profile and the number of such records for production, upon call from memory, of an output indication thereof.

10. The method of claim 9 wherein said truth values for each record satisfying the search profile are employed to reduce said logic code to a single truth value.

11. The method of claim 9 wherein the number of stored addresses is signaled to a user and wherein a different search profile is applied to said computer by said user.

PO-1050
(5/69)

UNITED STATES PATENT OFFICE
CERTIFICATE OF CORRECTION

Patent No. 3,614,744 Dated October 19, 1971

Inventor(s) James W. Sweeney

It is certified that error appears in the above-identified patent and that said Letters Patent are hereby corrected as shown below:

Col 3, line 24, cancel "alpha".
Col 4, line 74, "$4(C+P)+p(\underline{p}=2)+K<R$" should be
--$4(C+P)+P(\bar{P}+2)+K<R$--.
Col 9, line 42, the heading "FIGURES 1 and 2" has been omitted.
Col 10, line 32, "film" should be --file--.
Col 11, line 34, "III" should be --111--;
line 45, "III" should be --111--.
Col 14, line 37, "if" should be --If--;
line 56, "1 is" should be --one (1) is--;
line 59, "a 1" should be --a one (1)--.
Col 17, line 35, "1" should be --one (1)--;
line 39, "1" should be --one (1)--;
line 42, "FIGURE FIG. 9" should be --FIGURE 9--.

Signed and sealed this 17th day of October 1972.

(SEAL)
Attest:

EDWARD M.FLETCHER,JR.
Attesting Officer

ROBERT GOTTSCHALK
Commissioner of Patents